United States Patent
Zhang et al.

(10) Patent No.: US 11,317,336 B2
(45) Date of Patent: Apr. 26, 2022

(54) COMMUNICATION METHOD, COMMUNICATIONS APPARATUS, AND SYSTEM

(71) Applicant: HUAWEI TECHNOLOGIES CO., LTD., Guangdong (CN)

(72) Inventors: Hongping Zhang, Shanghai (CN); Wenjie Peng, Shanghai (CN); Mingzeng Dai, Shanghai (CN); Yang Zhao, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 42 days.

(21) Appl. No.: 16/875,243

(22) Filed: May 15, 2020

(65) Prior Publication Data
US 2020/0280899 A1 Sep. 3, 2020

Related U.S. Application Data

(63) Continuation of application No. PCT/CN2018/113937, filed on Nov. 5, 2018.

(30) Foreign Application Priority Data

Nov. 16, 2017 (CN) .......................... 201711140890.6

(51) Int. Cl.
H04W 4/00 (2018.01)
H04W 36/30 (2009.01)
(Continued)

(52) U.S. Cl.
CPC ........... *H04W 36/30* (2013.01); *H04W 36/08* (2013.01); *H04W 48/10* (2013.01)

(58) Field of Classification Search
CPC ..... H04W 36/30; H04W 36/08; H04W 48/10; H04W 48/20; H04W 36/00; H04W 36/0055
See application file for complete search history.

(56) References Cited

U.S. PATENT DOCUMENTS 10,687,339 B2* 6/2020 Babaei .................. H04L 5/001
2017/0013551 A1 1/2017 Martin
(Continued)

FOREIGN PATENT DOCUMENTS

CN 102612133 A 7/2012
CN 102932927 A 2/2013
(Continued)

OTHER PUBLICATIONS

3GPP TS 38.304 v0.0.5 (Oct. 2017). "3rd Generation Partnership Project; Technical Specification Group Radio Access Network; New Generation Radio Access Network; User Equipment (UE) procedures in Idle mode (Release 15)," Oct. 2017, 12 pages.
(Continued)

*Primary Examiner* — Amancio Gonzalez
(74) *Attorney, Agent, or Firm* — Fish & Richardson P.C.

(57) ABSTRACT

Example communication methods and apparatus are described. One example communication method includes receiving broadcast information by a terminal device. The broadcast information includes a first parameter and a second parameter that are for a first cell. The first parameter is used for cell selection or cell reselection performed by a terminal device that supports supplementary uplink (SUL) carrier transmission, and the second parameter is used for cell selection or cell reselection performed by a terminal device that does not support SUL carrier transmission. The terminal device performs cell selection or cell reselection based on the first parameter when the terminal device supports SUL carrier transmission. The terminal device performs cell selection or cell reselection based on the second parameter when the terminal device does not support SUL carrier transmission.

20 Claims, 7 Drawing Sheets

(51) Int. Cl.
*H04W 36/08* (2009.01)
*H04W 48/10* (2009.01)

(56) References Cited

U.S. PATENT DOCUMENTS

| | | | |
|---|---|---|---|
| 2017/0118701 A1 | 4/2017 | Kim et al. | |
| 2020/0280913 A1* | 9/2020 | Chen | H04W 48/20 |
| 2020/0396654 A1* | 12/2020 | Freda | H04W 36/06 |

FOREIGN PATENT DOCUMENTS

| | | | |
|---|---|---|---|
| CN | 103037441 A | 4/2013 | |
| CN | 103875285 A | 6/2014 | |
| CN | 105611539 A | 5/2016 | |
| CN | 105992190 A | 10/2016 | |
| CN | 106233789 A | 12/2016 | |
| CN | 106454876 A | 2/2017 | |
| CN | 106900033 A | 6/2017 | |
| EP | 2800412 A1 | 11/2014 | |
| JP | 2012506674 A | 3/2012 | |
| JP | 2014500685 A | 1/2014 | |
| JP | 2020535715 A | 12/2020 | |
| RU | 2611015 C2 | 2/2017 | |
| WO | 2015012655 A1 | 1/2015 | |
| WO | 2016144099 A1 | 9/2016 | |
| WO | 2016190711 A1 | 12/2016 | |
| WO | 2019065618 A1 | 4/2019 | |
| WO | 2019093813 A1 | 5/2019 | |

OTHER PUBLICATIONS

Intel Corporation, "Remaining issues on NR-LTE co-existence," 3GPP TSG RAN WG1 Meeting NR#3, R1-1716334, Nagoya, Japan, Sep. 18-21, 2017, 5 pages.

Office Action issued in Chinese Application No. 201910691233.3 dated Feb. 13, 2020, 15 pages (with English translation).

Office Action issued in Chinese Application No. 201711140890.6 dated Jan. 3, 2020, 23 pages (with English translation).

ZTE, Snapechips, "Remaining details of RACH procedure," 3GPP TSG RAN WG1 Meeting #90bis, R1-1717036,, Prague, Czech Republic, Oct. 9-13, 2017, 23 pages.

Extended European Search Report issued in European Application No. 18879835.9 dated Oct. 29, 2020, 11 pages.

ZTE, Sanechips, "Discussion on SUL carrier," 3GPP TSG RAN WG1 Meeting #99bis, R2-1711841, Prague, Czech, Oct. 9-13, 2017, 6 pages.

CMCC, "Discussion on Pcompensation type parameters in S-criteria for NR," 3GPP TSG-RAN WG4 Meeting #86, R4-1801582, Athens, GR, Feb. 26-Mar. 2, 2018, 6 pages.

Office Action in Japanese Application No. 2020526906, dated Apr. 26, 2021, 9 pages.

Office Action issued in Russian Application No. 2020119586/07(033217) dated Dec. 13, 2021, 17 pages (with English translation).

\* cited by examiner

COMMUNICATION METHOD, COMMUNICATIONS APPARATUS, AND SYSTEM

CROSS-REFERENCE TO RELATED APPLICATIONS

This application is a continuation of international Application No. PCT/CN2018/113937, filed on Nov. 5, 2018, which claims priority to Chinese Patent Application 201711140890.6, filed on Nov. 16, 2017. The disclosures of the aforementioned applications are hereby incorporated herein by reference in its entirety.

TECHNICAL FIELD

This application relates to the communications field, and more specifically, to a communication method, a communications apparatus, and a system.

BACKGROUND

For a conventional cell, an uplink frequency is the same as or similar to a downlink frequency. For downlink, transmit power of a base station is basically unlimited, but transmit power of a terminal device is limited due to factors such as a battery and costs. To increase coverage of the cell, the base station may use larger transmit power for transmission to increase downlink coverage, but the terminal device cannot increase uplink coverage by using a method same as that for downlink (that is, increasing the transmit power) due to reasons such as limitation to maximum transmit power. As a result, the uplink coverage is inconsistent with the downlink coverage. In a new technology, in addition to an original uplink, a cell may also have an additional uplink frequency band having a lower frequency, which is referred to as a supplementary uplink (SUL) carrier. A terminal device may perform uplink transmission by using the SUL, thereby improving uplink coverage.

However, some terminal devices support the SUL in performing uplink transmission, and some terminal devices do not support the SUL in performing uplink transmission. Therefore, when the terminal devices perform cell selection or cell reselection, the terminal devices that support SUL carrier transmission and the terminal devices that do not support SUL carrier transmission both need to be considered, to prevent the terminal devices from performing cell selection or cell reselection too early or too late, and avoid degrading system performance.

SUMMARY

This application provides a communication on method, a communications apparatus, and a system, to prevent the terminal device from performing cell selection or cell reselection too early or too late.

According to a first aspect, a communication method is provided. The method includes: receiving, by a terminal device, broadcast information, where the broadcast information includes a first parameter and a second parameter that are for a first cell, the first parameter is used for cell selection or cell reselection performed by a terminal device that supports supplementary uplink SUL carrier transmission, and the second parameter is used for cell selection or cell reselection performed by a terminal device that does not support SUL carrier transmission; and performing, by the terminal device, cell selection or cell reselection based on the first parameter when the terminal device supports SUL carrier transmission; or performing, by the terminal device, cell selection or cell reselection based on the second parameter when the terminal device does not support SUL carrier transmission.

According to the communication method in this embodiment of this application, the broadcast information includes the first parameter and the second parameter that are for the first cell. The first parameter is used for cell selection or cell reselection performed by the terminal device that supports supplementary uplink SUL carrier transmission, and the second parameter is used for cell selection or cell reselection performed by the terminal device that does not support SUL carrier transmission. In this way, the terminal device performs cell selection or cell reselection based on the first parameter when the terminal device supports SUL carrier transmission; or the terminal device performs cell selection or cell reselection based on the second parameter when the terminal device does not support SUL carrier transmission. Therefore, the terminal device that supports SUL carrier transmission and the terminal device that does not support SUL carrier transmission can be both considered, to prevent the terminal devices from performing cell selection or cell reselection too early or too late, thereby improving system performance.

With reference to the first aspect, in some implementations of the first aspect, the first parameter is used to determine a minimum receive level required by the first cell for the terminal device that supports SUL carrier transmission, and the second parameter is used to determine a minimum receive level required by the first cell for the terminal device that does not support SUL carrier transmission.

With reference to the first aspect, in some implementations of the first aspect, the first parameter is used to indicate a minimum receive level value required by the first cell for the terminal device that supports SUL carrier transmission, and the second parameter is used to indicate a minimum receive level value required by the first cell for the terminal device that does not support SUL carrier transmission; or the first parameter is used to indicate a difference between a minimum receive level value required by the first cell for the terminal device that does not support SUL carrier transmission and a minimum receive level value required by the first cell for the terminal device that supports SUL carrier transmission, and the second parameter is used to indicate the minimum receive level value required by the first cell for the terminal device that does not support SUL carrier transmission; or the first parameter is used to indicate a minimum receive level value required by the first cell for the terminal device that supports SUL carrier transmission, and the second parameter is used to indicate a difference between a minimum receive level value required by the first cell for the terminal device that does not support SUL carrier transmission and the minimum receive level value required by the first cell for the terminal device that supports SUL carrier transmission.

According to the communication method in this embodiment of this application, the minimum receive levels required by the first cell are determined by using the first parameter or the second parameter when the terminal devices having different capabilities perform uplink transmission in the first cell, so that the terminal devices having different capabilities may have different determining methods or criteria when performing cell selection or cell reselection. In this way, the terminal devices having different capabilities can be considered, to prevent the terminal devices from performing cell selection or cell reselection too early or too late, thereby improving system performance.

With reference to the first aspect, in some implementations of the first aspect, the performing, by the terminal device, cell selection or cell reselection based on the first parameter when the terminal device supports SUL carrier transmission includes: calculating, by the terminal device, a cell selection receive level value of the first cell based on the first parameter, and performing, by the terminal device, cell selection or cell reselection based on the level value; or the performing, by the terminal device, cell selection or cell reselection based on the second parameter when the terminal device does not support SUL carrier transmission includes: calculating, by the terminal device, a cell selection receive level value of the first cell based on the second parameter, and performing, by the terminal device, cell selection or cell reselection based on the level value.

According to the communication method in this embodiment of this application, the terminal devices having different capabilities perform cell selection or cell reselection based on different level values when performing cell selection or cell reselection. In this way, the terminal devices having different capabilities can be considered, to prevent the terminal devices from performing cell selection or cell reselection too early or too late, thereby improving system performance.

With reference to the first aspect, in some implementations of the first aspect, the first cell is a serving cell or a neighboring cell of the terminal device.

With reference to the first aspect, in some implementations of the first aspect, a value of the first parameter is less than a value of the second parameter.

With reference to the first aspect, in some implementations of the first aspect, after determining that the broadcast information includes the first parameter and the second parameter that are for the first cell, the terminal device determines that a frequency band used by the first cell includes an SUL frequency band.

According to the communication method in this embodiment of this application, the terminal device may determine, after determining that the broadcast information includes the first parameter and the second parameter, that the frequency band used by the first cell includes the SUL frequency band. Dedicated indication information is not required, so that signaling overheads may be reduced.

With reference to the first aspect, in some implementations of the first aspect, a received signal strength value of the first cell is measured. When the first cell is the serving cell of the terminal device, and the terminal device supports SUL carrier transmission, the method includes: when the received signal strength value is less than a preset threshold, initiating, by the terminal device when originating initial access, a random access procedure by using the SUL frequency band of the first cell: or when the received signal strength value is not less than a preset threshold, initiating, by the terminal device when originating initial access, a random access procedure by using a primary uplink frequency band of the first cell.

According to the communication method in this embodiment of this application, the terminal device determines, by determining the received signal strength value of the first cell and the preset threshold, an uplink frequency band by using which the random access procedure is initiated, thereby increasing a success rate of initiating the random access procedure by the terminal device.

With reference to the first aspect, in some implementations of the first aspect, the initiating, by the terminal device, a random access procedure by using a primary uplink frequency band includes: initiating, by the terminal device by using the SUL frequency band, the random access procedure when a quantity of failures of the random access procedure initiated by the terminal device by using the primary uplink frequency band is greater than a preset first threshold.

According to the communication method in this embodiment of this application, the terminal device may also increase, by determining whether the quantity of failures of the random access procedure initiated by the terminal device by using the primary uplink frequency band is greater than the preset first threshold, the success rate of initiating the random access procedure by the terminal device.

According to a second aspect, a communication method is provided. The method includes: sending, by a network device, broadcast information, where the broadcast information includes a first parameter and a second parameter that are for a first cell, the first parameter is used for cell selection or cell reselection performed by a terminal device that supports supplementary uplink SUL carrier transmission, and the second parameter is used for cell selection or cell reselection performed by a terminal device that does not support SUL carrier transmission.

According to the communication method in this embodiment of this application, the broadcast information includes the first parameter and the second parameter that are for the first cell. The first parameter is used for cell selection or cell reselection performed by the terminal device that supports supplementary uplink SUL carrier transmission, and the second parameter is used for cell selection or cell reselection performed by the terminal device that does not support SUL carrier transmission. In this way, the terminal device that supports SUL carrier transmission and the terminal device that does not support SUL carrier transmission can be both considered, to prevent the terminal devices from performing cell selection or cell reselection too early or too late, thereby improving system performance.

With reference to the second aspect, in some implementations of the second aspect, the first parameter is used to determine a minimum receive level required by the first cell for the terminal device that supports SUL carrier transmission, and the second parameter is used to determine a minimum receive level required by the first cell when the terminal device that does not support SUL carrier transmission performs uplink transmission in the first cell.

With reference to the second aspect, in some implementations of the second aspect, the first parameter is used to indicate a minimum receive level value required by the first cell for the terminal device that supports SUL carrier transmission, and the second parameter is used to indicate a minimum receive level value required by the first cell for the terminal device that does not support SUL carrier transmission; or the first parameter is used to indicate a difference between a minimum receive level value required by the first cell for the terminal device that does not support SUL carrier transmission and a minimum receive level value required by the first cell for the terminal device that supports SUL carrier transmission, and the second parameter is used to indicate the minimum receive level value required by the first cell for the terminal device that does not support SUL carrier transmission; or the first parameter is used to indicate a minimum receive level value required by the first cell for the terminal device that supports SUL carrier transmission, and the second parameter is used to indicate a difference between a minimum receive level value required by the first cell for the terminal device that does not support SUL carrier transmission and the minimum receive level value required by the first cell for the terminal device that supports SUL carrier transmission.

According to the communication method in this embodiment of this application, the minimum receive levels required by the first cell for the terminal devices having different capabilities are determined by using the first parameter or the second parameter, so that the terminal devices having different capabilities may have different determining methods or criteria when performing cell selection or cell reselection. In this way, the terminal devices having different capabilities can be considered, to prevent the terminal devices from performing cell selection or cell reselection too early or too late, thereby improving system performance.

With reference to the second aspect, in some implementations of the second aspect, the first cell is a serving cell or a neighboring cell of the terminal device.

With reference to the second aspect, in some implementations of the second aspect, a value of the first parameter is less than a value of the second parameter.

With reference to the second aspect, in some implementations of the second aspect, after it is determined that the broadcast information sent by the network device includes the first parameter and the second parameter that are for the first cell, it is determined that a frequency band used by the first cell includes an SUL frequency band.

According to the communication method in this embodiment of this application, after that the broadcast information includes the first parameter and the second parameter is determined, it may be determined that the frequency band used by the first cell includes the SUL frequency band. Dedicated indication information is not required, so that signaling overheads may be reduced.

According to a third aspect, an apparatus is provided. The apparatus provided in this application has a function of implementing behavior of the terminal device in the foregoing method aspect, and includes a corresponding means configured to perform the step or the function described in the foregoing method aspect. The step or the function may be implemented by software, hardware, or a combination of hardware and software.

In a possible design, the apparatus includes one or more processors and a communications unit. The one or more processors are configured to support the apparatus in performing a corresponding function in the foregoing method, for example, performing cell selection or cell reselection based on a parameter. The communications unit is configured to support communication between the apparatus and another device, to implement a receiving and/or a sending function, for example, receiving broadcast information.

Optionally, the apparatus may further include one or more memories. The memory is configured to be coupled to the processor, and stores a program instruction and/or data necessary for the apparatus. The one or more memories may be integrated with the processor, or may be disposed independent of the processor. This is not limited in this application.

The apparatus may be an intelligent terminal, a wearable device, or the like, and the communications unit may be a transceiver or a transceiver circuit. Optionally, the transceiver may be an input/output circuit or interface.

The apparatus may alternatively be a communications chip. The communications unit may be an input/output circuit or interface of the communications chip.

In another possible design, the terminal device includes a transceiver, a processor, and a memory. The processor is configured to control the transceiver to receive and send a signal, the memory is configured to store a computer program, and the processor is configured to invoke the computer program from the memory for running, so that the terminal device performs the method completed by the terminal device in any one of the first aspect or the possible implementations of the first aspect.

According to a fourth aspect, a network device is provided. The network device provided in this application has a function of implementing behavior of the network device in the foregoing method aspect, and includes a corresponding means configured to perform the step or the function described in the foregoing method aspect. The step or the function may be implemented by software, hardware, or a combination of hardware and software.

In a possible design, the network device includes one or more processors and a communications unit. The one or more processors are configured to support the network device in implementing a corresponding function in the foregoing method, for example, determining that broadcast information includes a first parameter and a second parameter. The communications unit is configured to support communication between the network device and another device, so as to implement a receiving and/or a sending function, for example, sending the broadcast information.

Optionally, the network device may further include one or more memories. The memory is configured to be coupled to the processor, and store a program instruction and/or data necessary for the network device. The one or more memories may be integrated with the processor, or may be disposed independent of the processor. This is not limited in this application.

The network device may be a base station, a gNB, a TRP, or the like, and the communications unit may be a transceiver or a transceiver circuit. Optionally, the transceiver may be an input/output circuit or interface.

The network device may alternatively be a communications chip. The communications unit may be an input/output circuit or interface of the communications chip.

In another possible design, the network device includes a transceiver, a processor, and a memory. The processor is configured to control the transceiver to receive and send a signal, the memory is configured to store a computer program, and the processor is configured to invoke the computer program from the memory for running, so that the network device performs the method completed by the network device in any one of the second aspect or the possible implementations of the second aspect.

According to a fifth aspect, a system is provided. The system includes the foregoing terminal device and the network device.

According to a sixth aspect, a computer readable storage medium is provided. The computer readable storage medium is configured to store a computer program, and the computer program includes an instruction used to perform the method according to any one of the first aspect or the possible implementations of the first aspect.

According to a seventh aspect, a computer readable storage medium is provided. The computer readable storage medium is configured to store a computer program, and the computer program includes an instruction used to perform the method according to any one of the second aspect or the possible implementations of the second aspect.

According to an eighth aspect, a computer program product is provided. The computer program product includes computer program code. When the computer program code is run on a computer, the computer is enabled to perform the method according to any one of the first aspect or the possible implementations of the first aspect.

According to a ninth aspect, a computer program product is provided. The computer program product includes computer program code. When the computer program code is run on a computer, the computer is enabled to perform the method according to any one of the second aspect or the possible implementations of the second aspect.

DESCRIPTION OF EMBODIMENTS

Figure 1:
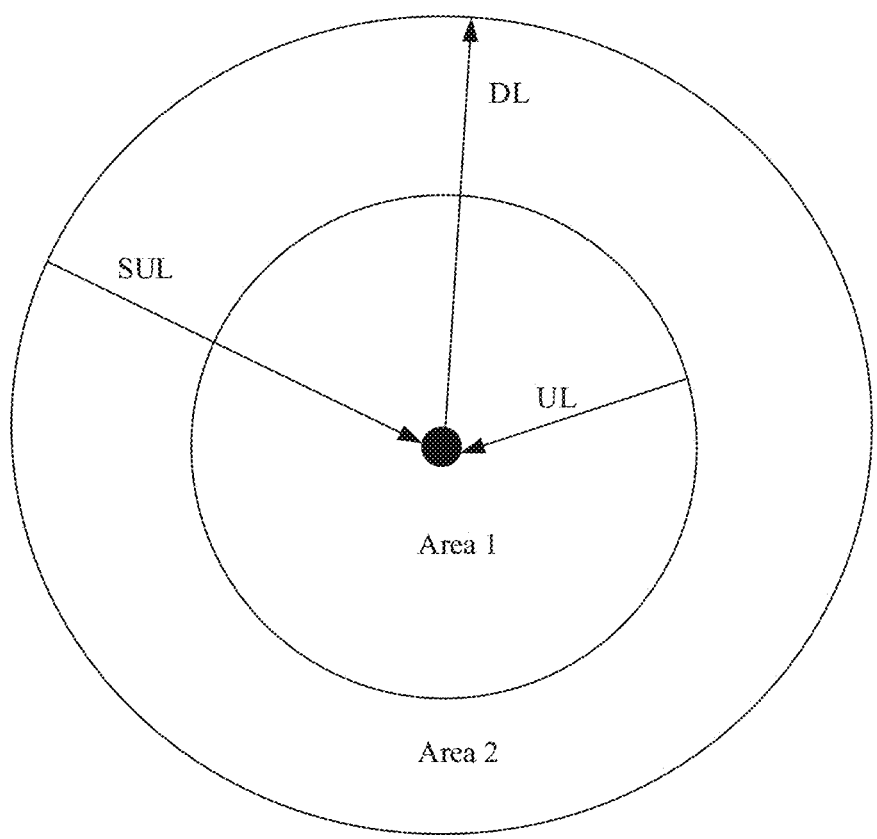
FIG. 1 is a schematic diagram of an SUL cell applicable to an embodiment of this application.

The following describes technical solutions of this application with reference to accompanying drawings.

The technical solutions of embodiments of this application may be applied to various communications systems, such as a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LIE time division duplex (TDD) system, a universal mobile telecommunications system (UMTS), a worldwide interoperability for microwave access (WiMAX) communications system, a future $5^{th}$ generation (5G) system, or a new radio (NR) system.

A terminal device in the embodiments of this application may be referred to as user equipment, an access terminal, a subscriber unit, a subscriber station, a mobile station, a mobile console, a remote station, a remote terminal, a mobile device, a user terminal, a terminal, a wireless communications device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, or a terminal device in a future evolved public land mobile network (PLMN). This is not limited in the embodiments of this application.

A network device in the embodiments of this application may be a device configured to communicate with the terminal device. The network device may be a base transceiver station (BTS) in the global system for mobile communications (GSM) or code division multiple access (CDMA) system, or may be a NodeB (NB) in a wideband code division multiple access (WCDMA) system, or may be an evolved NodeB (eNB or eNodeB) in an LIE system, or may be a radio controller in a cloud radio access network (CRAN) scenario, or may be a relay station, an access point, a vehicle-mounted device, a wearable device, a network device in the future 5G network, or a network device in the future evolved PLMN. This is not limited in the embodiments of this application.

An embodiment of this application provides a communication method, and the method may be applied to cell selection or cell reselection.

At present, when a terminal device is powered on or a radio link failure occurs, the terminal device performs a cell search process and selects a suitable cell to camp on as soon as possible. This process is referred to as "cell selection". In the cell search process, the terminal device reads system information of a cell, and obtains parameters such as $Q_{rxlevmeas}$, $Q_{rxlevmin}$, and $Q_{rxlevminoffset}$. The terminal device evaluates whether the cell is the suitable cell according to the criterion S. Once the suitable cell, that is, a cell meets the criterion S, is found, the cell selection process is completed. If the cell is not the suitable cell, the terminal device continues to search until the terminal device finds the suitable cell and camps on the cell.

A criterion S formula is Srxlev >0, that is, if an S value of a cell is greater than 0, it indicates that the cell suitable cell, namely, a cell suitable for camping on. A calculation formula of Srxlev is as follows:

$$Srxlev = Q_{rxlevmeas} - (Q_{rxlevmin} - Q_{rxlevminoffset}) - Pcompensation, \text{ where}$$

Srxlev is a cell selection receive level value obtained through calculation;

$Q_{rxlevmeas}$ is a received signal strength value measured by the terminal device, and the value is measured reference signal receiving power (RSRP);

$Q_{rxlevmin}$ is a minimum received signal strength value required by the cell;

Pcompensation is a larger value in $(P_{EMAX} - P_{UMAX})$ or 0, $P_{EMAX}$ is maximum allowed transmit power set by a system when the terminal device accesses the cell, and $P_{UMAX}$ refers to maximum output power specified based on a level of the terminal device; and $Q_{rxlevminOffset}$ is only valid during cell selection evaluation performed when the terminal device periodically searches for a higher-priority public land mobile network (PLMN) while camping normally in a virtual private mobile network (VPMN), and this parameter has an offset to $Q_{rxlevmin}$.

It should be noted that due to evolution of communication protocol versions, the criterion S formula and the calculation formula of Srxlev may change due to some reasons. The formulas provided herein are only examples, and these examples do not impose any limitation on the formulas.

After the terminal device camps on a cell, with movement of the terminal device, the terminal device may need to move to another cell having a higher priority or better signal strength. This is a cell reselection process. Cell selection is a process of finding a suitable cell as soon as possible. Cell reselection is a process of selecting a more suitable cell. To save power for the terminal device, a measurement criterion is defined in a protocol as follows:

the terminal device always measures a frequency layer or system whose priority is higher than that of a camped cell;

in the camped cell, if Srxlev≤$S_{intrasearch}$, the terminal device starts intra-frequency cell measurement, where $S_{intrasearch}$ is an intra-frequency measurement threshold;

in the camped cell, if Srxlev≤$S_{nonintrasearch}$ or if $S_{nonintrasearch}$ is not configured, the terminal device starts measurement of a frequency and a system that have a same priority or a frequency and a system that have a lower priority.

After the measurement, the terminal device determines whether to reselect to a new cell. Reselection criteria are as follows:

a reselection criterion for the frequency or system having a higher priority: in a target frequency cell. Srxlev>$Thresh_{x\text{-}high}$, this lasts for a period of time, where $Thresh_{x\text{-}high}$ refers to a threshold of reselection from a current serving carrier to the frequency having a higher priority;

a reselection criterion for the frequency or system having a lower priority: in the camped cell, Srxlev<$Thresh_{serving\text{-}low}$, this lasts for a period of time, where $Thresh_{serving\text{-}low}$ refers to a threshold of reselection from a current serving carrier to the frequency having a lower priority;

a reselection criterion for the frequency or system having a same priority: cell reselection to a cell at a frequency having a same priority based on a ranking rule for intra-frequency cell reselection. The ranking rule for intra-frequency cell reselection is as follows: $R_s$ is a ranking value of a current camped cell, and $R_n$ is a ranking value of a neighboring cell:

$$R_s = Q_{meas\_s} + Q_{hyst}, R_n = Q_{meas\_s} Q\text{offset, where}$$

$Q_{hyst}$ is a hysteresis value, used to prevent ping-pong reselection;

$Q_{meas\_s}$ is a received signal strength value of the camped cell measured by the terminal device; and for intra-frequency cells, a value of Qoffset is $Qoffset_{s\_n}$, and $Qoffset_{s\_n}$ is a difference between received signal quality requirements of the two cells; or for inter-frequency cells, a value of Qoffset is $Qoffset_{s\_n} + Qoffset_{frequency}$, and $Qoffset_{frequency}$ is a frequency offset between two frequencies.

The terminal device sorts ranking values of all cells that meet the criterion S for cell selection, and reselects a cell having a largest ranking value.

Configuration parameters required by the current camped cell and the neighboring cell are broadcast in a system message of the current camped cell, so that the terminal device can calculate the parameters such as $R_s$ and $R_n$.

It should be noted that due to evolution of the communication protocol versions, calculation formulas of $R_s$ and $R_n$ may change due to some reasons. The formulas provided herein are only examples, and these examples do not impose any limitation on the formulas.

However, in a current standard discussion, a new technology emerges, that is, in addition to an original uplink frequency band, a cell may also have an additional uplink frequency band having a lower frequency, namely, a supplementary uplink (SUL) carrier, and a terminal device may perform uplink transmission by using the additional uplink frequency band, thereby increasing uplink coverage to enable the uplink coverage to be consistent with downlink coverage.

In this embodiment of this application, for brevity, if a frequency band used by a cell includes an SUL frequency band, the cell is referred to as an SUL cell, and another cell is referred to as a common cell. For the SUL cell, the SUL frequency band and a primary uplink (UL) frequency band are included. The UL frequency band is a common uplink frequency band, and the SUL frequency band is different from the UL frequency band. FIG. 1 is a schematic diagram of an SUL cell.

It can be learned from FIG. 1 that uplink coverage of the SUL cell includes a UL frequency band and an SUL frequency band. The UL frequency band can cover only an area 1, and the SUL frequency band can also cover an area 2. It can be learned that, in the SUL cell, the SUL frequency band is introduced, so that downlink (DL) coverage of the cell is nearly the same as the uplink coverage.

Because terminal devices have different capabilities, some terminal devices support SUL carrier transmission, and some terminal devices do not support SUL carrier transmission. In the SUL cell, when a terminal device that supports SUL carrier transmission is located in the area 2, the terminal device may initiate a random access procedure only by using the SUL frequency band; and a terminal device that does not support SUL carrier transmission may perform uplink transmission only by using the UL frequency band.

It should be noted that "the terminal device that does not support SUL carrier transmission" in this specification includes a case that the terminal device does not support an SUL feature, or a case that the terminal device supports the SUL feature but does not support the SUL frequency band of the SUL cell.

In a current standard, impact of the SUL frequency band on a cell selection or reselection mechanism is not considered. If a current cell selection or reselection mechanism is still used, the terminal device that supports SUL carrier transmission and the terminal device that does not support SUL carrier transmission may not be both considered. Consequently, a case in which the terminal devices perform reselection too early or too late is caused, and system performance is degraded. For example, when the terminal device that does not support SUL carrier transmission performs cell reselection in the foregoing manner, the terminal device may reselect to the SUL cell, and when the terminal device that does not support SUL carrier transmission is in the area 2 of the SUL cell, the terminal device cannot successfully initiate initial access. This is a consequence caused by that the terminal device performs reselection too early, so that the system performance is degraded.

An embodiment of this application provides a communication method. The method may be applied to cell selection or cell reselection, to prevent the terminal device from performing reselection too early or too late.

Figure 2:
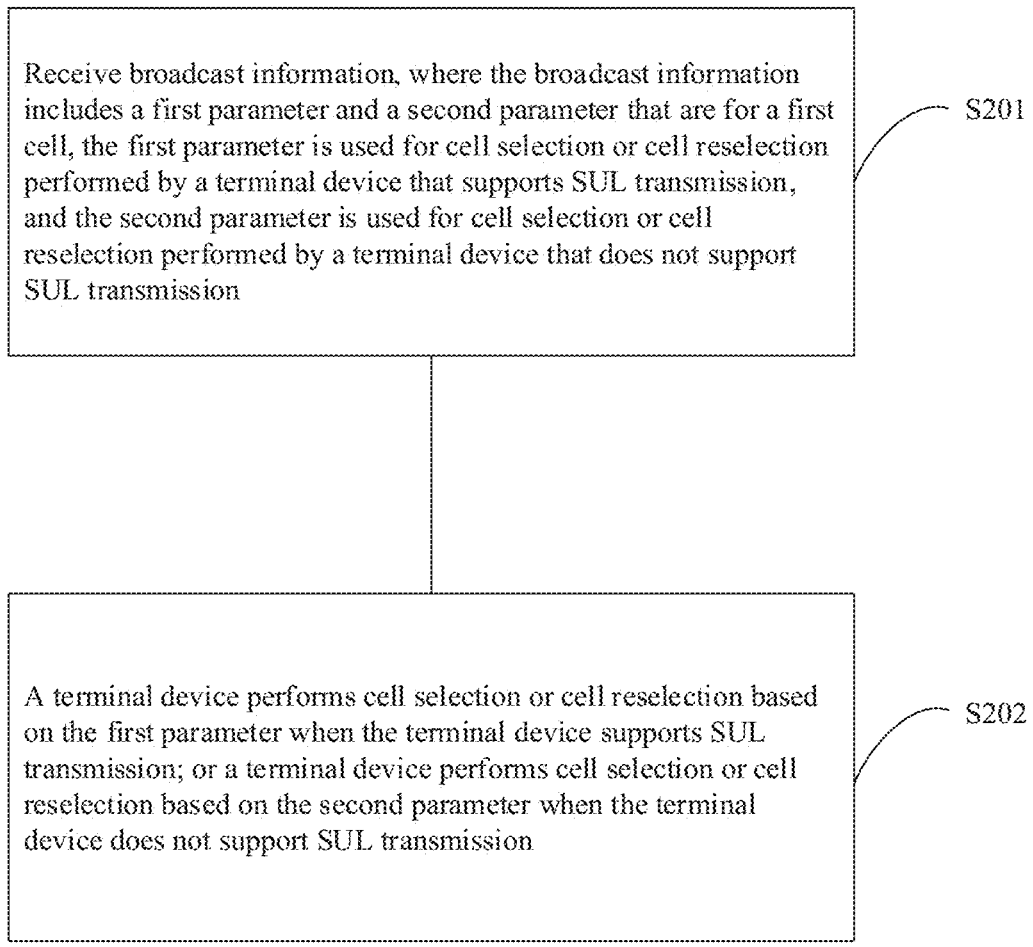
FIG. 2 is a schematic block diagram of a communication method according to an embodiment of this application.

FIG. 2 is a schematic diagram of a communication method according to an embodiment of this application.

S201: A terminal device receives broadcast information, where the broadcast information includes a first parameter and a second parameter that are for a first cell, the first parameter is used for cell selection or cell reselection performed by a terminal device that supports supplementary uplink SUL carrier transmission, and the second parameter is used for cell selection or cell reselection performed by a terminal device that does not support SUL carrier transmission.

According to this embodiment of this application, the terminal device that supports SUL carrier transmission and the terminal device that does not support SUL carrier transmission perform cell selection or cell reselection based on different parameters, to prevent the terminal device from performing selection or reselection too early or too late.

In a process of performing cell selection or cell reselection, the terminal device receives the broadcast information. The broadcast information includes the first parameter and the second parameter that are for the first cell, and the first parameter and the second parameter are used to determine whether to select camping on the first cell, or whether to reselect to the first cell, or whether to reselect to another cell from the first cell. The first cell may be a serving cell of the terminal device, or may be a neighboring cell of the terminal device.

After the terminal device receives the broadcast information once, the broadcast information may be used a plurality of times. For example, the broadcast information includes the first parameter and the second parameter that are for the first cell, so that in an entire process of cell selection or cell reselection performed by the terminal device, or in processes of cell reselection and determination that are performed a plurality of times, the first parameter and the second parameter may be used a plurality of times.

Optionally, the first parameter is used to determine a minimum receive level value required by the first cell for the terminal device that supports SUL carrier transmission, and the second parameter is used to determine a minimum receive level value required by the first cell for the terminal device that does not support SUL carrier transmission.

Optionally, the first parameter is used to indicate a minimum receive level value required by the first cell for the terminal device that supports SUL carrier transmission, and the second parameter is used to indicate a difference between a minimum receive level value required by the first cell for the terminal device that does not support SUL carrier transmission and the minimum receive level value required by the first cell for the terminal device that supports SUL carrier transmission. In this case, optionally, the minimum receive level value required by the first cell for the terminal device that does not support SUL carrier transmission is equal to a sum of the first parameter and the second parameter.

Optionally, the first parameter is used to indicate a difference between a minimum receive level value required by the first cell for the terminal device that does not support SUL carrier transmission and a minimum receive level value required by the first cell for the terminal device that supports SUL carrier transmission, and the second parameter is used to indicate the minimum receive level value required by the first cell for the terminal device that does not support SUL carrier transmission. In this case, the minimum receive level value required by the first cell for the terminal device that supports SUL carrier transmission is equal to a difference between the second parameter and the first parameter.

S202: The terminal device performs cell selection or cell reselection based on the first parameter when the terminal device supports SUL carrier transmission; or the terminal device performs cell selection or cell reselection based on the second parameter when the terminal device does not support SUL carrier transmission.

Optionally, the terminal device calculates a cell selection receive level value of the first cell based on the first parameter when the terminal device supports SUL carrier transmission, and the terminal device performs cell selection or cell reselection based on the level value.

Optionally, the terminal device calculates a cell selection receive level value of the first cell based on the second parameter when the terminal device does not support SUL carrier transmission, and the terminal device performs cell selection or cell reselection based on the level value.

Optionally, a value of the first parameter is less than a value of the second parameter.

Subsequently, detailed description is provided based on the following three scenarios.

Scenario 1

In the scenario 1: The terminal device currently needs to perform cell selection, and the terminal device may select an SUL cell, or may select a common cell. In this embodiment of this application, that the terminal device performs cell selection according to the foregoing criterion S is used as an example for description.

The broadcast information further includes parameters such as $Q_{rxlevmeas}$ and $Q_{rxlevminoffset}$ for cell selection. Meanings of $Q_{rxlevmeas}$ and $Q_{rxlevminoffset}$ are the same as those described above, and are not described herein again.

Figure 3:
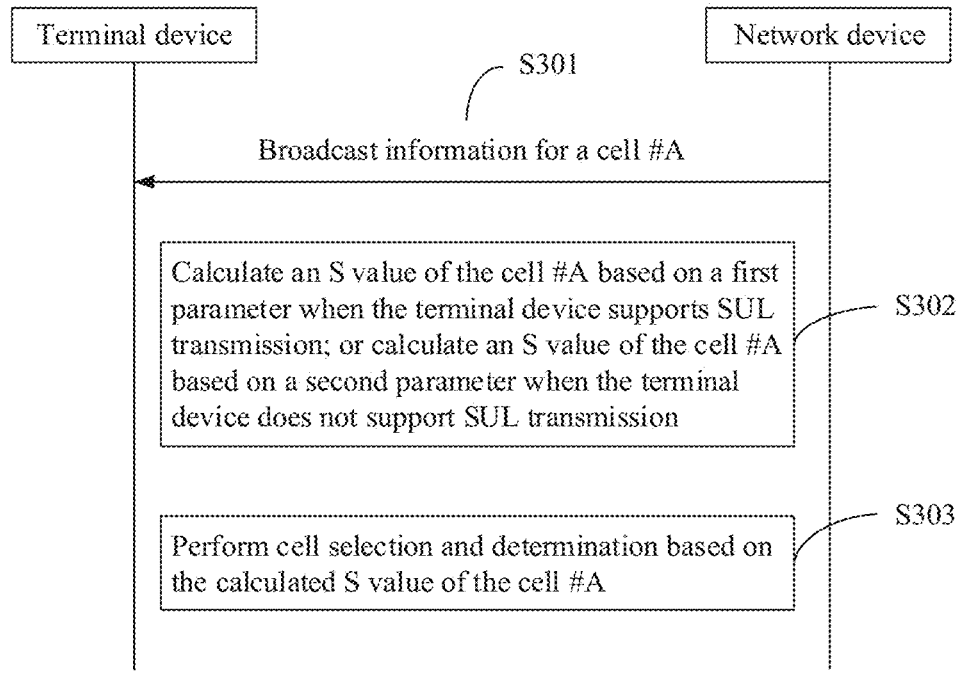
FIG. 3 is another schematic interaction diagram of a communication method according to an embodiment of this application.

As shown in FIG. 3, the following three steps are included.

S301: A terminal device receives broadcast information for a cell #A sent by a network device, where the broadcast information includes a first parameter and a second parameter.

The broadcast information is broadcast information in system information of the cell #A received by the terminal device.

S302: An S value of the cell #A is calculated based on the first parameter when the terminal device supports SUL carrier transmission; or an S value of the cell #A is calculated based on the second parameter when the terminal device does not support SUL carrier transmission.

S303: Cell selection and determination are performed based on the calculated S value of the cell #A.

In this embodiment of this application, impact of the SUL cell on cell selection or cell reselection performed by the terminal device is considered. Although a cell selected by the terminal device during cell selection may be an SUL cell, or may be a common cell, only the SUL cell is considered herein, that is, the cell #A is an SUL cell.

Optionally, the first parameter is used to determine a minimum receive level value required by the cell #A for the terminal device that supports SUL carrier transmission, and the second parameter is used to determine a minimum receive level value required by the cell #A for the terminal device that does not support SUL carrier transmission.

As an example rather than a limitation, the first parameter is a minimum receive level value required by the cell #A for the terminal device that supports SUL carrier transmission, and the second parameter is a minimum receive level value required by the cell #A for the terminal device that does not support SUL carrier transmission.

As an example rather than a limitation, the first parameter is used to indicate a difference between a minimum receive level value required by the cell #A for the terminal device that does not support SUL carrier transmission and a minimum receive level value required by the cell #A for the terminal device that supports SUL carrier transmission, and the second parameter is used to indicate the minimum receive level value required by the cell #A for the terminal device that does not support SUL carrier transmission.

As an example rather than a limitation, the first parameter is used to indicate a minimum receive level value required by the cell #A for the terminal device that supports SUL carrier transmission, and the second parameter is used to indicate a difference between a minimum receive level value required by the cell #A for the terminal device that does not support SUL carrier transmission and the minimum receive level value required by the cell #A for the terminal device that supports SUL carrier transmission.

The terminal device that supports SUL carrier transmission calculates, based on the first parameter, a cell selection receive level value Srxlev of the cell #A, that is, the S value of the cell #A, and then the terminal device performs cell selection based on the level value; or the terminal device that does not support SUL carrier transmission calculates, based on the second parameter, a cell selection receive level value Srxlev of the cell #A, that is, the S value of the cell #A, and then the terminal device performs cell selection based on the level value.

In addition, the criterion S formula or a selection rule may be modified to prevent different types of terminal devices from performing cell selection too early or too late or from a failure to select a suitable cell. Specifically, at least the following manners are included.

Manner 1

The terminal device that supports SUL carrier transmission may calculate the S value based on the following modified criterion S formula. The modified criterion S formula is:

$$Srxlev\_1 = Q_{rxlevmeas} - (Q_{rxlevmin} - Q_{rxlevminoffset}) - \text{Offset}\_1 - P\text{compensation, where}$$

Offset_1 is an offset value, the offset value may be set by the network device based on a capability of the terminal device or a configuration of the network device, and is sent to the terminal device by using the system information. This is not limited in this application, and meanings of other parameters are the same as those described above.

The terminal device that does not support SUL carrier transmission may use a same calculation formula of the S value as that in the prior art, or may calculate the S value by using the modified criterion S formula but Offset_1 is 0.

Manner 2

The terminal device that does not support SUL carrier transmission may calculate the S value based on the following modified criterion S formula. The modified criterion S formula is:

$$Srxlev\_2 = Q_{rxlevmeas} - (Q_{rxlevmin} - Q_{rxlevminoffset}) + \text{Offset}\_2 - P\text{compensation, where}$$

Offset_2 is an offset value, the offset value may be set by the network device based on a capability of the terminal device or a configuration of the network device, and is sent to the terminal device by using the system information. This is not limited in this application, and meanings of other parameters are the same as those described above.

The terminal device that supports SUL carrier transmission may use a same calculation formula of the S value as that in the prior art, or may calculate the S value by using the modified criterion S formula, but Offset_2 is 0.

Manner 3

The terminal device that does not support SUL carrier transmission may calculate the S value based on the following modified criterion S formula. The modified criterion S formula is:

$$Srxlev\_3 - \text{Offset}\_3 = Q_{rxlevmeas} - (Q_{rxlevmin} - Q_{rxlevminoffset}) - P\text{compensation, where}$$

Offset_3 is an offset value, the offset value may be set by the network device based on a capability of the terminal device or a configuration of the network device, and is sent to the terminal device by using the system information. This is not limited in this application, and meanings of other parameters are the same as those described above.

The terminal device that supports SUL carrier transmission may use a same calculation formula of the S value as that in the prior art, or may calculate the S value by using the modified criterion S formula, but Offset_3 is 0.

Manner 4

For the terminal device that does not support SUL carrier transmission, the selection rule may be modified as follows:

$$(Srxlev\_4 - \text{Offset}\_4) > 0, \text{ where}$$

Offset_4 is an offset value, the offset value may be set by the network device based on a capability of the terminal device or a configuration of the network device, and is sent to the terminal device by using the system information. This is not limited in this application.

The terminal device that supports SUL carrier transmission may use a same cell selection rule as that in the prior art, or may use the foregoing modified cell selection rule, but Offset_4 is 0.

The foregoing manners 1 to 4 are merely examples. This application is not limited thereto. All other methods and processes in which types of the terminal devices can be considered during cell selection fall within the protection scope of this application.

In the scenario 1, the S value is calculated for different types of terminal devices in the SUL cell, so that a case in which the terminal device that supports SUL carrier transmission and the terminal device that does not support SUL carrier transmission cannot be both considered in the SUL cell can be effectively avoided, so as to avoid a case in which selection is performed too early or too late, or avoid selecting to a cell that is not suitable. In this way, system performance is improved.

Subsequently, a scenario 2 and a scenario 3 are considered.

Scenario 2

In the scenario 2, the terminal device currently camps on an SUL cell, and the terminal device may need to reselect to another SUL cell or common cell.

If the terminal device is able to support SUL carrier transmission, the terminal device may continue to camp on the current cell in both an area 1 and an area 2.

If the terminal device is unable to support SUL carrier transmission, the terminal device may not perform reselection in the area 1, but needs to reselect to another cell when in the area 2. Because in the area 2, the terminal device can only perform SUL carrier transmission.

Scenario 3

In the scenario 3, the terminal device currently camps on a common cell, and may need to reselect to an SUL cell.

For an SUL neighboring cell, that is, a neighboring cell of a current serving cell of the terminal device is an SUL cell, impact of an SUL frequency band on cell reselection performed by the terminal device needs to be considered.

Both the scenario 2 and the scenario 3 are for cell reselection, and may be described together.

It should be noted that, using the scenario 2 as an example, the terminal device camps on the SUL cell, and calculates an S value of a serving cell based on the manner in the scenario 1, and starts a measurement criterion. A specific measurement criterion is described below. A manner in which the terminal device calculates an S value of a camped cell is similar to that in the scenario 1. For example, the S value of the serving cell is calculated by the terminal device in the manners 1 to 4 in the scenario 1. For brief description, details are not described herein again.

It should be noted that when the terminal device performs cell reselection, a method for calculating the S value of the serving cell is similar to that in the scenario 1, and details are not described herein again.

In this embodiment of this application, that the terminal device uses the current cell reselection manner described above is used as an example for description.

The terminal device currently camps on a cell that is denoted as a cell #B, and cell reselection is required. The terminal device receives broadcast information included in system information sent by the cell #B. The broadcast information includes broadcast information for the cell #B and broadcast information for a neighboring cell. During cell selection, the broadcast information for the cell #B has been received, and when the terminal device performs cell reselection, an $R_s$ value may be calculated again based on the previously received broadcast information for the cell #B. $R_s$ is a ranking value of a current serving cell, namely, the cell #B. The terminal device also receives broadcast information of the neighboring cell. In this embodiment of this application, impact of the SUL cell on cell selection or reselection is considered. Therefore, for the neighboring cell, only a case in which the neighboring cell is an SUL cell is considered herein.

There are many manners in which the terminal device determines that the serving cell or the neighboring cell is an SUL cell. Optionally, after determining that the broadcast information includes the first parameter and the second parameter that are for the first cell, the terminal device determines that the frequency band used by the first cell includes an SUL frequency band, that is, the first cell is an SUL cell. This provides an advantage that no dedicated indication information is required, and signaling overheads are reduced. Alternatively, the terminal device receives broadcast information for the neighboring cell. The broadcast information includes indication information indicating that the neighboring cell is an SUL cell.

Figure 4:
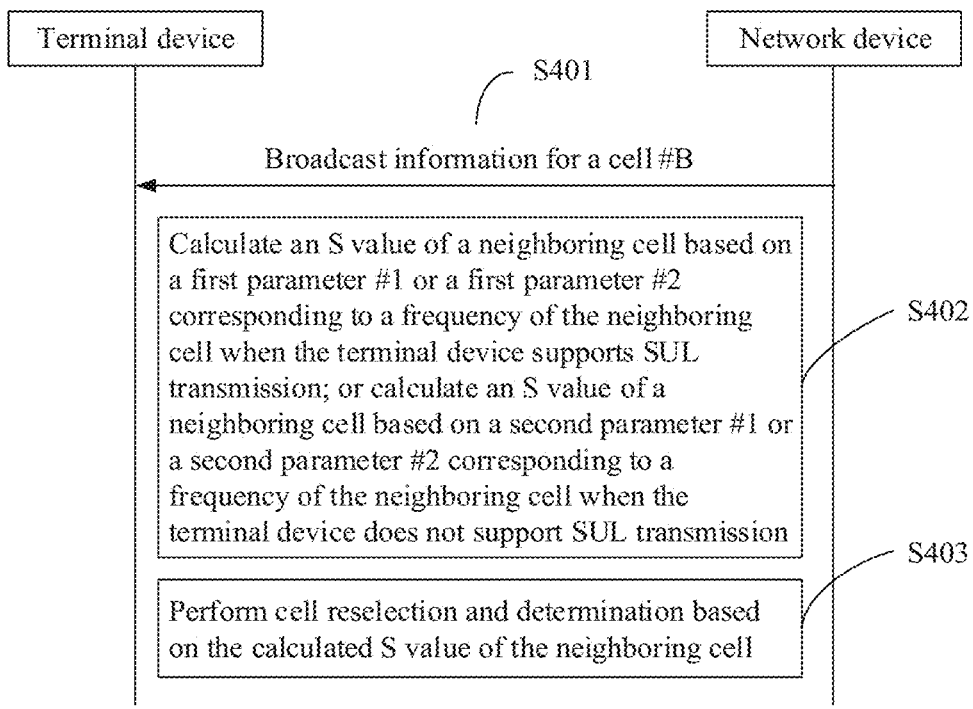
FIG. 4 is still another schematic interaction diagram of a communication method according to an embodiment of this application.

As described above, the cell #B is the serving cell of the terminal device, and the terminal device receives the broadcast information of the serving cell. The broadcast information includes the first parameter and the second parameter that are for the first cell. Herein, the first cell is the neighboring cell. Description is provided with reference to FIG. 4.

S401: Receive the broadcast information of the cell #B. In other words, the terminal device receives the broadcast information of the serving cell.

Optionally, the broadcast information includes a first parameter #1 (that is, an example of the first parameter) and a second parameter #1 (that is, an example of the second parameter) that are for a neighboring cell having a same frequency as the cell #B, or the broadcast information includes a first parameter #2 (that is, an example of the first parameter) and a second parameter #2 (that is, an example of the second parameter) that are for a neighboring cell having a frequency different from that of the cell #B. The first parameter #1 is used to determine a minimum receive level value required by the neighboring cell having the same frequency for a terminal device that supports SUL carrier transmission, and the second parameter #1 is used to determine a minimum receive level value required by the neighboring cell having the same frequency for a terminal device that does not support SUL carrier transmission. The first parameter #2 is used to determine a minimum receive level value required by the neighboring cell having the different frequency for the terminal device that supports SUL carrier transmission, and the second parameter #2 is used to determine a minimum receive level value required by the neighboring cell having the different frequency for the terminal device that does not support SUL carrier transmission.

Optionally, the broadcast information includes a first parameter #1 (that is, an example of the first parameter) and a second parameter #1 (that is, an example of the second parameter) that are for a neighboring cell having a same frequency as the cell #B, and further includes a first parameter #2 (that is, an example of the first parameter) and a second parameter #2 (that is, an example of the second parameter) that are for a neighboring cell having a frequency different from that of the cell #B. The first parameter #1 is used to determine a minimum receive level value required by the neighboring cell having the same frequency for a terminal device that supports SUL carrier transmission, and the second parameter #1 is used to determine a minimum receive level value required by the neighboring cell having the same frequency for a terminal device that does not support SUL carrier transmission. The first parameter #2 is used to determine a minimum receive level value required by the neighboring cell having the different frequency for the terminal device that supports SUL carrier transmission, and the second parameter #2 is used to determine a minimum receive level value required by the neighboring cell having the different frequency for the terminal device that does not support SUL carrier transmission.

As an example rather than a limitation, the first parameter #1 is the minimum receive level value required by the neighboring cell having the same frequency for the terminal device that supports SUL carrier transmission, and the second parameter #1 is the minimum receive level value required by the neighboring cell having the same frequency for the terminal device that does not support SUL carrier transmission. The first parameter #2 is used to determine the minimum receive level value required by the neighboring cell having the different frequency for the terminal device that supports SUL carrier transmission, and the second parameter #2 is used to determine the minimum receive level value required by the neighboring cell having the different frequency for the terminal device that does not support SUL carrier transmission.

As an example rather than a limitation, the first parameter #1 is the minimum receive level value required by the neighboring cell having the same frequency for the terminal device that supports SUL carrier transmission, and the second parameter #1 is a difference between the minimum receive level value required by the neighboring cell having the same frequency for the terminal device that does not support SUL carrier transmission and the minimum receive level value required by the neighboring cell having the same frequency for the terminal device that supports SUL carrier transmission. The first parameter #2 is the minimum receive level value required by the neighboring cell having the different frequency for the terminal device that supports SUL carrier transmission, and the second parameter #2 is a difference between the minimum receive level value required by the neighboring cell having the different frequency for the terminal device that supports SUL carrier transmission and the minimum receive level value required by the neighboring cell having the different frequency for the terminal device that does not support SUL carrier transmission.

As an example rather than a limitation, the first parameter #1 is a difference between the minimum receive level value required by the neighboring cell having the same frequency for the terminal device that does not support SUL carrier transmission and the minimum receive level value required by the neighboring cell having the same frequency for the terminal device that supports SUL carrier transmission, and the second parameter #1 is the minimum receive level value required by the neighboring cell having the same frequency for the terminal device that does not support SUL carrier transmission. The first parameter #2 is a difference between the minimum receive level value required by the neighboring cell having the different frequency for the terminal device that does not support SUL carrier transmission and the minimum receive level value required by the neighboring cell having the different frequency for the terminal device that supports SUL carrier transmission, and the second parameter #2 is the minimum receive level value required by the neighboring cell having the different frequency for the terminal device that does not support SUL carrier transmission.

Optionally, not all neighboring cells at a frequency are SUL cells or common cells, that is, some are SUL cells, and some are common cells. The broadcast information may further include information about an SUL cell list at each frequency, or information about a common cell list at each frequency, or indication information indicating whether a cell in a cell list is an SUL cell, so that the terminal device that supports SUL carrier transmission can select the first parameter #1 or the first parameter #2 based on the broadcast information.

Optionally, a plurality of different SUL cells at a same frequency have different coverage requirements, so that downlink transmit power of base station may vary. In this case, different first parameters and/or second parameters may be set for different cells, in other words, the first parameters and/or the second parameters are at a cell level. In other words, a cell list exists in each frequency, and each cell in the cell list corresponds to a first parameter and/or a second parameter. The first parameter is used for cell reselection performed by the terminal device that supports SUL carrier transmission, and the second parameter is used for cell reselection performed by the terminal device that does not support SUL carrier transmission. The first parameter #1 and the second parameter #1 are similar to the first parameter and the second parameter in the scenario 1, and details are not described herein again.

Optionally, to obtain information about a neighboring cell, base stations exchange a configuration of the first parameter and/or the second parameter, for example, when establishing an interface between the base stations.

S402: Calculate an S value of the neighboring cell based on the first parameter #1 or the first parameter #2 corresponding to a frequency of the neighboring cell when the terminal device supports SUL carrier transmission; and calculate the S value of the neighboring cell based on the second parameter #1 or the second parameter #2 corresponding to the frequency of the neighboring cell when the terminal device does not support SUL carrier transmission.

That corresponding to the frequency of the neighboring cell means that if the frequency of neighboring cell is the same as that of the cell #B, the first parameter #1 or the second parameter #1 is used; and if the frequency of the neighboring cell is different from that of the cell #B, the first parameter #2 or the second parameter #2 is used.

Specifically, a function of the first parameter #2 is similar to that of the first parameter #1, that is, the first parameter #1 or the first parameter #2 is used for cell selection or cell reselection performed by the terminal device that supports SUL carrier transmission. A function of the second parameter #2 is similar to that of the second parameter #1, that is, the second parameter #1 or the second parameter #2 is used for cell selection or cell reselection performed by the terminal device that does not support SUL carrier transmission. The first parameter #1 and the second parameter #1 are for the cell having the same frequency as the cell #B, and the first parameter #2 and the second parameter #2 are for the cell having the frequency different from that of the cell #B. Calculation of the S value is similar to that in the scenario 1, and details are not described herein again.

S403: Perform cell reselection and determination based on the calculated S value of the neighboring cell.

Optionally, the calculation manner of the S value in the scenario 1 is also applicable to the scenario 2 and the scenario 3.

Optionally, the terminal device is the terminal device that does not support SUL carrier transmission. If the cell #B is an SUL cell, a measurement criterion for cell reselection is as follows:

in the serving cell, if Srxlev≤$S_{intrasearch}$+Offset, the terminal device starts intra-frequency cell measurement;

in the serving cell, if Srxlev≤$S_{nonintrasearch}$+Offset or if $S_{nonintrasearch}$ is not configured, the terminal device starts measurement of a frequency and a system that have a same priority or a frequency and a system that have a lower priority, where Offset is a preset offset value, the preset offset value may be set by the network device based on a capability of the terminal device or a configuration of the network device. This is not limited in this application. Meanings of other parameters are the same as those described above, and details are not described herein again.

During cell reselection, reselection criteria for an SUL neighboring cell are follows:

a reselection criterion for a frequency or system having a higher priority: in a target frequency cell, Srxlev>$Thresh_{x\text{-}high}$+Offset, and this lasts in a cell reselection time;

a reselection criterion for a frequency or system having a lower priority (using an example in which the serving cell is also an SUL cell): in the serving cell, Srxlev<$Thresh_{serving\text{-}low}$+Offset-s, in the target frequency cell, Srxlev>$Thresh_{x\text{-}low}$+Offset-n, and this lasts in the cell reselection time.

Offset, Offset-s, and Offset-n are all offset values, and Offset-s and Offset-n are respectively an offset value of the serving cell and an offset value of the target frequency cell. The offset value may be set by the network device based on the capability of the terminal device or the configuration of the network device. This is not limited in this application. Meanings of other parameters are the same as those described above, and details are not described herein again.

The terminal device that supports SUL carrier transmission may perform cell reselection in an existing manner, or the foregoing offset is set to 0.

In the foregoing manner, different types of terminal devices are considered in both the measurement criterion and the reselection rule of cell reselection, to prevent the terminal devices from performing reselection too early or too late, thereby improving system performance.

Optionally, for a reselection criterion for a frequency having a same priority, as described above, impact of the SUL frequency band should be considered in ranking sorting. Although a measured downlink signal of an SUL serving cell or the SUL neighboring cell is very good, due to uplink, the terminal device that does not support SUL carrier transmission may be still at an edge by which reselection is required. Therefore, a ranking value calculated for the SUL cell needs to be corrected, and then sorted together with that of other cells, so that ranking of the SUL cell is adjusted backward.

Optionally, $R_s=Q_{meas\_s}$–Offset_sul+$Q_{hysts}$, $R_n=Q_{meas\_s}$–Offset_sul–Qoffset, where Offset_sul may use an offset value the same as the criterion S value, or may be a difference between the second parameter and the first parameter, or may be a dedicated offset configured by a network.

For the terminal device that supports SUL carrier transmission, it may be considered that uplink coverage and downlink coverage of the SUL cell are consistent. The original formula can be directly used, or the foregoing formula is also used, but a value of Offset_sul is 0.

Optionally, for a reselection criterion for a frequency having a same priority, the ranking value calculated for the SUL cell may be corrected in another manner, that is, for the terminal device that supports SUL carrier transmission, the ranking value calculated for the SUL cell needs to be corrected, and then sorted together with that of other cells, so that sorting of the ranking value is adjusted forward. Optionally, $R_s=Q_{meas\_s}$+Offset_sul+$Q_{hysts}$, $R_n=Q_{meas\_s}$+Offset_sul–Qoffset, where Offset_sul may use the offset value the same as the criterion S value, or may be the difference between the second parameter and the first parameter, or may be the dedicated offset configured by the network.

For the terminal device that does not support SUL carrier transmission, the original formula can be directly used, or the foregoing formula is also used, but the value of Offset_sul is 0.

Optionally, ranking sorting is performed for two groups, and the two groups are respectively used for sorting SUL cells and sorting common cells. An SUL cell is preferentially selected, or a common cell is preferentially selected, or a cell in a group is preferentially selected based on a network configuration. If there are a plurality of cells in a same group, a cell having a largest ranking value is selected.

For the scenario 2, when the terminal device camps on the SUL cell and performs cell selection, a manner in which the terminal device calculates the S value in the camped cell is similar to that in the scenario 1, and details are not described herein again.

It should be noted that "the terminal device that does not support SUL carrier transmission" in this embodiment of this application includes a case that the terminal device does not support an SUL feature, or a case that the terminal device supports the SUL feature but does not support the SUL frequency band of the SUL cell.

According to the communication method in this embodiment of this application, the broadcast information received by the terminal device includes the first parameter and the second parameter. The first parameter is used for cell selection or cell reselection performed by the terminal device that supports SUL carrier transmission, and the second parameter is used for cell selection or cell reselection performed by the terminal device that does not support SUL carrier transmission. In this way, two types of terminal devices may be both considered, to prevent the terminal devices from performing selection or reselection too early or too late, further improving system performance.

Figure 5:
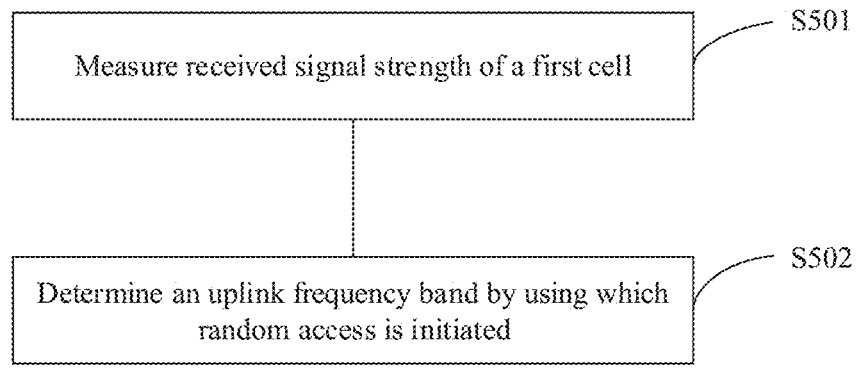
FIG. 5 is yet another schematic block diagram of a communication method according to an embodiment of this application.

The cell selection or cell reselection method according to the embodiments of this application is described above in detail with reference to FIG. 2 to FIG. 4. With reference to FIG. 5, the following describes in detail an uplink frequency band selected by a terminal device to initiate random access in an SUL cell.

S501: Measure a received signal strength value of a first cell.

S502: Determine an uplink frequency band by using which random access is initiated.

When the first cell is a serving cell of the terminal device and the first cell is also an SUL cell, and when the terminal device supports SUL carrier transmission, the determining method includes: when the received signal strength value is less than a preset threshold, initiating, by the terminal device when originating initial access, a random access procedure by using an SUL frequency band of the first cell; or when the received signal strength value is not less than a preset threshold, initiating, by the terminal device when originating initial access, a random access procedure by using a primary uplink frequency band of the first cell.

Optionally, a preset first threshold may be a second parameter, and the second parameter is the same as a second parameter used during cell selection or cell reselection. In this way, signaling overhead may be reduced.

Optionally, the preset threshold may alternatively be an independent threshold unrelated to a first parameter or a second parameter. In this way, flexibility may be improved. A specific value of the preset threshold may be determined based on a configuration of the network device or a capability of the terminal device. This is not limited in this application.

Optionally, the terminal device initiates, by using the SUL frequency band, the random access procedure when a quantity of failures of the random access procedure initiated by the terminal device by using the primary uplink frequency band is greater than a preset first threshold.

Due to an improper configuration of a threshold, a serious conflict during random access, or the like, random access initiated by the terminal device by using the primary uplink frequency band may fail a plurality of times, and when a quantity of failures exceeds the preset first threshold, the terminal device initiates the random access procedure by using the SUL frequency band. In this way, a success rate of random access may be improved. The preset first threshold may be configured by using a network, or may be configured based on experience. This is not limited in this application.

In addition, when a total quantity of failures of the random access procedure initiated by the terminal device reaches a preset second threshold, it may be considered that a radio link failure occurs. The total quantity of failures may be a sum of a quantity of failures of the random access procedure initiated by the terminal device by using the SUL frequency band and a quantity of failures of the random access procedure initiated by the terminal device by using the primary uplink frequency band.

In an implementation, when the first cell is the serving cell of the terminal device, and the first cell is an SUL cell, and when the terminal device does not support SUL carrier transmission, the determining method includes: when the terminal device that does not support SUL carrier transmission needs to initiate initial access, first if it is determined that signal strength of a current camped cell (the first cell) is less than a threshold, skipping, by the terminal device, initiating random access in the first cell, but initiating a cell selection process, and then originating initial access after changing a serving cell. In this manner, the terminal device is prevented from a plurality of failures after attempting random access a plurality of times.

Optionally, a terminal device that does not support SUL carrier transmission and a terminal device that supports SUL carrier transmission use a same cell selection parameter/mechanism or cell reselection parameter/mechanism. However, when the terminal device that does not support SUL carrier transmission needs to initiate initial access, first, it is determined that if signal strength of a current camped cell is less than a threshold (such as a threshold defined by a RAN 1 working group, or a new threshold), the terminal device initiates a cell reselection process, and then initiates initial access after changing a serving cell. In this manner, the terminal device is prevented from a plurality of failures after attempting random access a plurality of times. In addition, this manner is relatively easy.

The communication method according to the embodiments of this application is described above in detail from the perspective of the terminal device with reference to FIG. 2 to FIG. 5. The communication method according to an embodiment of this application is described below in detail from the perspective of a network device with reference to FIG. 6.

Figure 6:
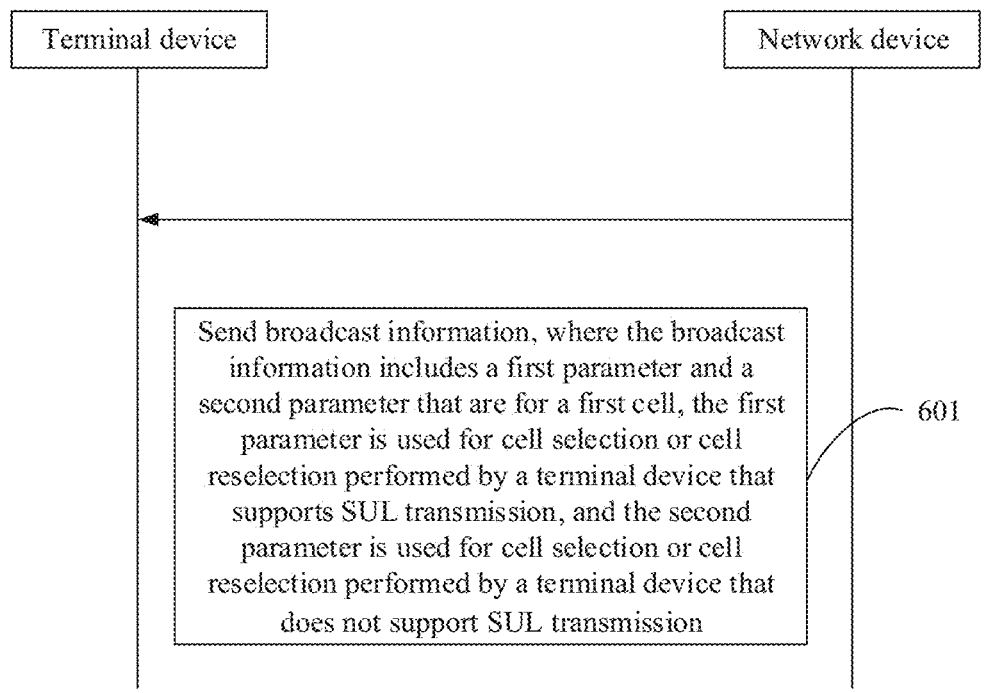
FIG. 6 is a schematic interaction diagram of a communication method according to another embodiment of this application.

FIG. 6 is a schematic diagram of a communication method according to another embodiment of this application.

601. The network device sends broadcast information, where the broadcast information includes a first parameter and a second parameter that are for a first cell, the first parameter is used for cell selection or cell reselection performed by a terminal device that supports supplementary uplink SUL carrier transmission, and the second parameter is used for cell selection or cell reselection performed by a terminal device that does not support SUL carrier transmission.

According to this embodiment of this application, the network device sends the broadcast information that includes the first parameter and the second parameter that are for the first cell, so that the terminal device that supports SUL carrier transmission and the terminal device that does not support SUL carrier transmission may be enabled to perform cell selection or cell reselection based on different parameters, to prevent the terminal device from performing selection or reselection too early or too late.

In a process of performing cell selection or cell reselection by a terminal device, the network device sends the broadcast information. The broadcast information includes the first parameter and the second parameter that are for the first cell, and the first parameter and the second parameter are used by the terminal device to determine whether to select camping on the first cell, or whether to reselect to the first cell. The first cell may be a serving cell of the terminal device, or may be a neighboring cell of the terminal device.

After the network device sends the broadcast information once, the broadcast information may be used by the terminal device a plurality of times. For example, the broadcast information includes the first parameter and the second parameter that are for the first cell, so that in an entire process of cell selection or cell reselection performed by the terminal device, or in processes of cell reselection that is performed a plurality of times, the first parameter and the second parameter may be used by the terminal device a plurality of times.

Optionally, the first parameter is used to determine a minimum receive level value required by the first cell for the terminal device that supports SUL carrier transmission, and the second parameter is used to determine a minimum receive level value required by the first cell for the terminal device that does not support SUL carrier transmission.

Optionally, the first parameter is a minimum receive level value required by the first cell for the terminal device that supports SUL carrier transmission, and the second parameter is a difference between a minimum receive level required by the first cell for the terminal device that supports SUL carrier transmission and the minimum receive level value required by the first cell for the terminal device that does not support SUL carrier transmission.

Optionally, the first parameter is a difference between a minimum receive level required by the first cell for the terminal device that does not support SUL carrier transmission and a minimum receive level value required by the first cell for the terminal device that supports SUL carrier transmission, and the second parameter is the minimum receive level required by the first cell for the terminal device that does not support SUL carrier transmission.

Optionally, a value of the first parameter is less than a value of the second parameter.

Subsequently, detailed description is provided based on the following three scenarios.

Scenario 1

In the scenario 1: The terminal device currently needs to perform cell selection, and may select an SUL cell, or may select a common cell. In this embodiment of this application, that the terminal device performs cell selection according to the foregoing criterion S is used as an example for description.

The broadcast information sent by the network device further includes parameters such as $Q_{rxlevmeas}$, $Q_{rxlevmin}$, and $Q_{rxlevminoffset}$ for cell selection. Meanings of $Q_{rxlevmeas}$, $Q_{rxlevmin}$, and $Q_{rxlevminoffset}$ are the same as those described above, and are not described herein again.

The network device sends broadcast information for a cell #A, and the broadcast information includes a first parameter and a second parameter.

This embodiment of this application considers impact of an SUL cell on cell selection or cell reselection performed by the terminal device. Although a cell selected during cell selection performed by the terminal device may be an SUL cell, or may be a common cell, only the SUL cell is considered, that is, the cell #A is an SUL cell.

Optionally, the first parameter is used to determine a minimum receive level value required by the cell #A for the terminal device that supports SUL carrier transmission, and the second parameter is used to determine a minimum receive level value required by the cell #A for the terminal device that does not support SUL carrier transmission.

As an example rather than a limitation, the first parameter is a minimum receive level value required by the cell #A for the terminal device that supports SUL carrier transmission, and the second parameter is a minimum receive level value required by the cell #A for the terminal device that does not support SUL carrier transmission.

As an example rather than a limitation, the first parameter is a minimum receive level value required by the cell #A for the terminal device that supports SUL carrier transmission, and the second parameter is a difference between the minimum receive level value required by the cell #A for the terminal device that supports SUL carrier transmission and a minimum receive level value required by the cell #A for the terminal device that does not support SUL carrier transmission.

As an example rather than a limitation, the first parameter is a difference between a minimum receive level value required by the cell #A for the terminal device that does not support SUL carrier transmission and a minimum receive level value required by the cell #A for the terminal device that supports SUL carrier transmission, and the second parameter is the minimum receive level value required by the cell for the terminal device that does not support SUL carrier transmission.

In the scenario 1, in the SUL cell, the broadcast information sent by the network device includes the first parameter and the second parameter. The first parameter is used for cell selection or cell reselection performed by the terminal device that supports SUL carrier transmission, and the second parameter is used for cell selection or cell reselection performed by the terminal device that does not support SUL carrier transmission, so that the terminal device that supports SUL carrier transmission and the terminal device that does not support SUL carrier transmission can be both considered in the SUL cell, to prevent the terminal devices from performing selection too early or too late, thereby improving system performance.

Subsequently, a scenario 2 and a scenario 3 are considered.

Scenario 2

In the scenario 2, the terminal device currently camps on an SUL cell, and the terminal device may need to reselect to another SUL cell or another common cell.

If the terminal device is able to support SUL carrier transmission, the terminal device may continue to camp on the current cell in both an area 1 and an area 2.

If the terminal device is unable to support SUL carrier transmission, the terminal device may not perform reselection in the area 1, but needs to reselect to another cell when in the area 2. Because in the area 2, the terminal device can only perform SUL carrier transmission.

Scenario 3

In the scenario 3, the terminal device currently camps on a common cell, and the terminal device may need to reselect to an SUL cell.

For an SUL neighboring cell, that is, a neighboring cell of a current serving cell of the terminal device is an SUL cell, impact of an SUL frequency band on cell reselection performed by the terminal device needs to be considered.

Both the scenario 2 and the scenario 3 are for cell reselection, and may be described together.

It should be noted that, using the scenario 2 as an example, the terminal device camps on the SUL cell. The terminal device starts a measurement criterion based on a calculated S value after the terminal device camps on the cell. A specific measurement criterion is described below. A method for calculating S values of the camped cell and a neighboring cell of the terminal device is the same as the method for calculating an S value during cell selection in the scenario 1. Steps S301 to S303, the manner 1 to the manner 4, and the like are included. Details are not described herein again.

In this embodiment of this application, that the terminal device uses the current cell reselection manner described above is used as an example for description.

The terminal device currently camps on a cell that is denoted as a cell #B, and cell reselection is required. When the terminal device performs cell selection, the network device has sent broadcast information for the cell #B. Therefore, the broadcast information may be used to calculate an $R_s$ value again when the terminal device performs cell reselection. $R_s$ is a ranking value of a current serving cell, namely, the cell #B. The broadcast information sent by the network device further includes broadcast information of the neighboring cell. In this embodiment of this application, impact of the SUL cell on cell selection or reselection is considered. Therefore, only a case in which the neighboring cell is an SUL cell is considered herein.

Optionally, after it is determined that the broadcast information sent by the network device includes the first parameter and the second parameter that are for the first cell, it is determined that a frequency band used by the first cell includes an SUL frequency band, that is, the neighboring cell is an SUL cell. Alternatively, the network device sends the broadcast information for the neighboring cell, and the broadcast information includes indication information indicating that the neighboring cell is an SUL cell.

Optionally, the broadcast information includes a first parameter #1 and a second parameter #1 that are for a neighboring cell having a same frequency as the cell #B, and further includes a first parameter #2 and a second parameter #2 that are for a neighboring cell having a frequency different from that of the cell #B. The first parameter #1 is used to determine a minimum receive level value required by the neighboring cell having the same frequency for a terminal device that supports SUL carrier transmission, and the second parameter #1 is used to determine a minimum receive level value required by the neighboring cell having the same frequency for a terminal device that does not support SUL carrier transmission. The first parameter #2 is used to determine a minimum receive level value required by the neighboring cell having the different frequency for the terminal device that supports SUL carrier transmission, and the second parameter #2 is used to determine a minimum receive level value required by the neighboring cell having the different frequency for the terminal device that does not support SUL carrier transmission.

As an example rather than a limitation, the first parameter #1 is the minimum receive level value required by the neighboring cell having the same frequency for the terminal device that supports SUL carrier transmission, and the second parameter #1 is the minimum receive level value required by the neighboring cell having the same frequency for the terminal device that does not support SUL carrier transmission. The first parameter #2 is used to determine the minimum receive level value required by the neighboring cell having the different frequency for the terminal device that supports SUL carrier transmission, and the second parameter #2 is used to determine the minimum receive level value required by the neighboring cell having the different frequency for the terminal device that does not support SUL carrier transmission.

As an example rather than a limitation, the first parameter #1 is the minimum receive level value required by the neighboring cell having the same frequency for the terminal device that supports SUL carrier transmission, and the second parameter #1 is a difference between the minimum receive level value required by the neighboring cell having the same frequency for the terminal device that supports SUL carrier transmission and the minimum receive level value required by the neighboring cell having the same frequency for the terminal device that does not support SUL carrier transmission. The first parameter #2 is the minimum receive level value required by the neighboring cell having the different frequency for the terminal device that supports SUL carrier transmission, and the second parameter #2 is a difference between the minimum receive level value required by the neighboring cell having the different frequency for the terminal device that supports SUL carrier transmission and the minimum receive level value required by the neighboring cell having the different frequency for the terminal device that does not support SUL carrier transmission.

As an example rather than a limitation, the first parameter #1 is a difference between the minimum receive level value required by the neighboring cell having the same frequency for the terminal device that does not support SUL carrier transmission and the minimum receive level value required by the neighboring cell having the same frequency for the terminal device that supports SUL carrier transmission, and the second parameter #1 is the minimum receive level value required by the neighboring cell having the same frequency for the terminal device that does not support SUL carrier transmission. The first parameter #2 is a difference between the minimum receive level value required by the neighboring cell having the different frequency for the terminal device that does not support SUL carrier transmission and the minimum receive level value required by the neighboring cell having the different frequency for the terminal device that supports SUL carrier transmission, and the second parameter #2 is the minimum receive level value required by the neighboring cell having the different frequency for the terminal device that does not support SUL carrier transmission.

Optionally, not all neighboring cells at a frequency are SUL cells or common cells, that is, some are SUL cells, and some are common cells. The broadcast information may further include information about an SUL cell list at each frequency, or information about a common cell list at each frequency, or indication information indicating whether a cell in a cell list is an SUL cell, so that the terminal device that supports SUL carrier transmission may select the first parameter #1 or the first parameter #2 based on the broadcast information.

Optionally, for a plurality of different SUL cells at a same frequency, downlink transmit power of base stations may vary based on different coverage requirements of the cells. In this case, different first parameters and/or second parameters may be set for different cells, in other words, the first parameters and/or the second parameters are at a cell level. In other words, a cell list exists in each frequency, and each cell in the cell list corresponds to a first parameter and/or a second parameter. The first parameter is used for cell reselection performed by the terminal device that supports SUL carrier transmission, and the second parameter is used for cell reselection performed by the terminal device that does not support SUL carrier transmission. The first parameter #1 and the second parameter #1 are similar to the first parameter and the second parameter in the scenario 1, and details are not described herein again.

Optionally, to obtain information about a neighboring cell, the base stations exchange a configuration of the first parameter and/or the second parameter, for example, when establishing an interface between the base stations.

It should be noted that, a function of the first parameter #2 is similar to that of the first parameter #1, that is, the first parameter #1 or the first parameter #2 is used for cell selection or cell reselection performed by the terminal device that supports SUL carrier transmission. A function of the second parameter #2 is similar to that of the second parameter #1, that is, the second parameter #1 or the second parameter #2 is used for cell selection or cell reselection performed by the terminal device that does not support SUL carrier transmission. The first parameter #1 and the second parameter #1 are for the cell having the same frequency as the cell #B. and the first parameter #2 and the second parameter #2 are for the cell having the frequency different from that of the cell #B.

According to the communication method in this embodiment of this application, the broadcast information sent by the network device includes the first parameter and the second parameter. The first parameter is used for cell selection or cell reselection performed by the terminal device that supports SUL carrier transmission, and the second parameter is used for cell selection or cell reselection performed by the terminal device that does not support SUL carrier transmission. In this way, two types of terminal devices may be both considered, to prevent the terminal devices from performing cell selection or cell reselection too early or too late, further improving system performance.

The communication method according to the embodiments of this application is described above in detail with reference to FIG. 2 to FIG. 6. Communications apparatuses according to the embodiments of this application are described below in detail with reference to FIG. 7 to FIG. 9.

Figure 7:
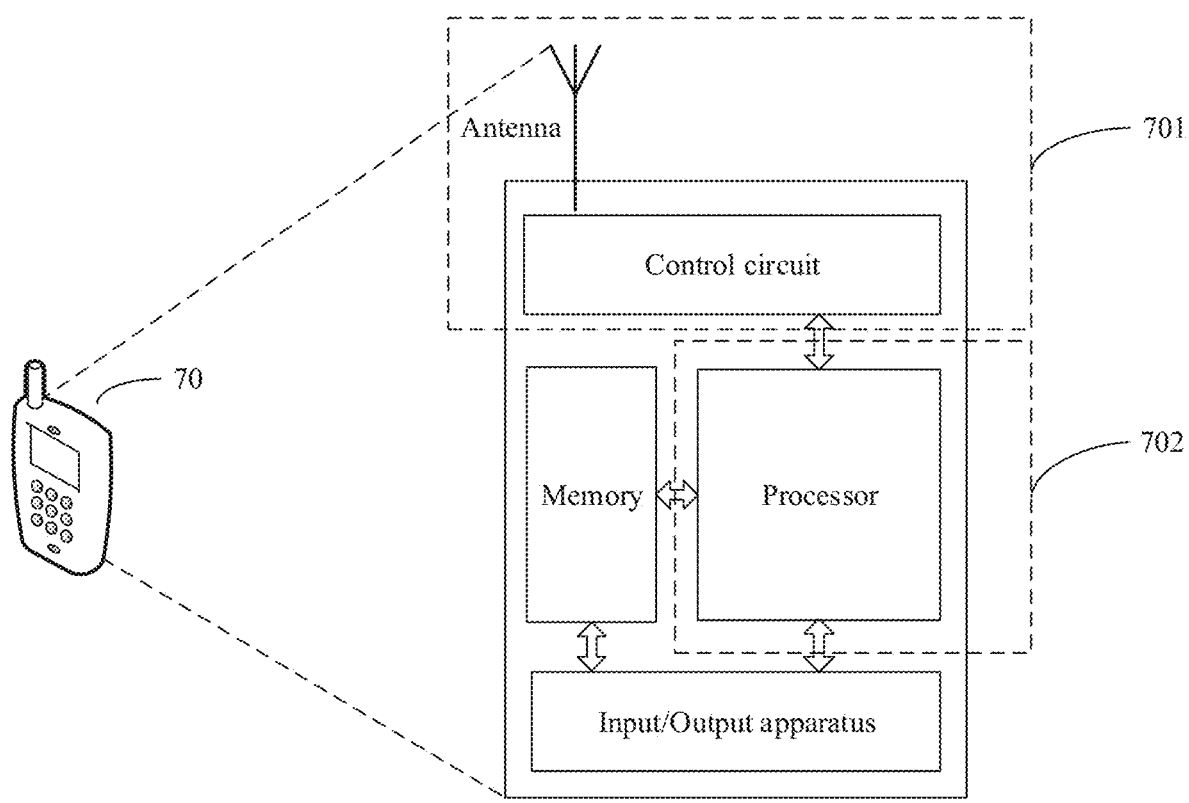
FIG. 7 is a schematic diagram of a terminal device according to an embodiment of this application.

FIG. 7 is a schematic structural diagram of a terminal device according to an embodiment of this application. The terminal device may be applicable to the cell shown in FIG. 1, to perform a function of the terminal device in the foregoing method embodiments. For ease of description, FIG. 7 shows only main components of the terminal device. As shown in FIG. 7, the terminal device 70 includes a processor, a memory, a control circuit, an antenna, and an input/output apparatus. The processor is mainly configured to: process a communication protocol and communication data, control the entire terminal device, execute a software program, and process data of the software program, for example, is configured to support the terminal device in performing an action described in the foregoing method embodiments, for example, performing cell selection or cell reselection based on the first parameter. The memory is mainly configured to store the software program and data, for example, store a correspondence between the indication information described in the foregoing embodiments and combination information. The control circuit is mainly configured to perform conversion between a baseband signal and a radio frequency signal, and process the radio frequency signal. A combination of the control circuit and the antenna may also be referred to as a transceiver that is mainly configured to receive and send a radio frequency signal in an electromagnetic wave form. The input/output apparatus such as a touchscreen, a display, or a key board is mainly configured to receive data entered by a user, and output data to the user.

After the terminal device is powered on, the processor may read a software program in a storage unit, explain and execute an instruction of the software program, and process data of the software program. When data needs to be sent in a wireless manner, the processor performs baseband processing on the to-be-sent data, and outputs a baseband signal to a radio frequency circuit. After the radio frequency circuit performs radio frequency processing on the baseband signal, a radio frequency signal is sent by using the antenna in an electromagnetic wave form. When data is sent to the terminal device, the radio frequency circuit receives a radio frequency signal by using the antenna, converts the radio frequency signal into a baseband signal, and outputs the baseband signal to the processor, and the processor converts the baseband signal into data and processes the data.

A person skilled in the art may understand that for ease of description, FIG. 7 shows only one memory and only one processor. Actually, the terminal device may include a plurality of processors and a plurality of memories. The memory may also be referred to as a storage medium, a storage device, or the like. This is not limited in this embodiment of this application.

In an optional implementation, the processor may include a baseband processor and a central processing unit. The baseband processor is mainly configured to process the communication protocol and the communication data, and the central processing unit is mainly configured to: control the entire terminal device, execute the software program, and process the data of the software program. Functions of the baseband processor and the central processing unit may be integrated into the processor in FIG. 7. A person skilled in the art may understand that the baseband processor and the central processing unit each may be an independent processor, and are interconnected by using technologies such as a bus. A person skilled in the art may understand that the terminal device may include a plurality of baseband processors to adapt to different network standards, the terminal device may include a plurality of central processing units to enhance a processing capability of the terminal device, and all components of the terminal device may be connected to each other by using various buses. The baseband processor may also be expressed as a baseband processing circuit or a baseband processing chip. The central processing unit may also be expressed as a central processing circuit or a central processing chip. A function of processing the communication protocol and the communication data may be embedded into the processor, or may be stored in the storage unit in a form of a software program. The processor executes the software program to implement a baseband processing function.

In this embodiment of this application, the antenna and the control circuit that have receiving and sending functions may be considered as a transceiver unit 701 of the terminal device 70. For example, the antenna and the control circuit are configured to support the terminal device in performing the receiving function described in FIG. 2. The processor having a processing function is considered as a processing unit 702 of the terminal device 70. As shown in FIG. 7, the terminal device 70 includes the transceiver unit 701 and the processing unit 702. The transceiver unit may also be referred to as a transceiver, a transceiver machine, a transceiver apparatus, or the like. Optionally, a device configured to implement a receiving function in the transceiver unit 701 may be considered as a receiving unit, and a device configured to implement a sending function in the transceiver unit 701 may be considered as a sending unit. In other words, the transceiver unit 701 includes a receiving unit and a sending unit. The receiving unit may also be referred to as a receiver, an input port, a receiving circuit, or the like. The sending unit may be referred to as a transmitter machine, a transmitter, a transmitting circuit, or the like.

The processor 702 may be configured to execute an instruction stored in the memory, to control the transceiver unit 701 to receive a signal and/or send a signal, so as to complete a function of the terminal device in the foregoing method embodiments. In an implementation, it may be considered that functions of the transceiver unit 701 are implemented by using a transceiver circuit or a transceiver-dedicated chip.

Figure 8:
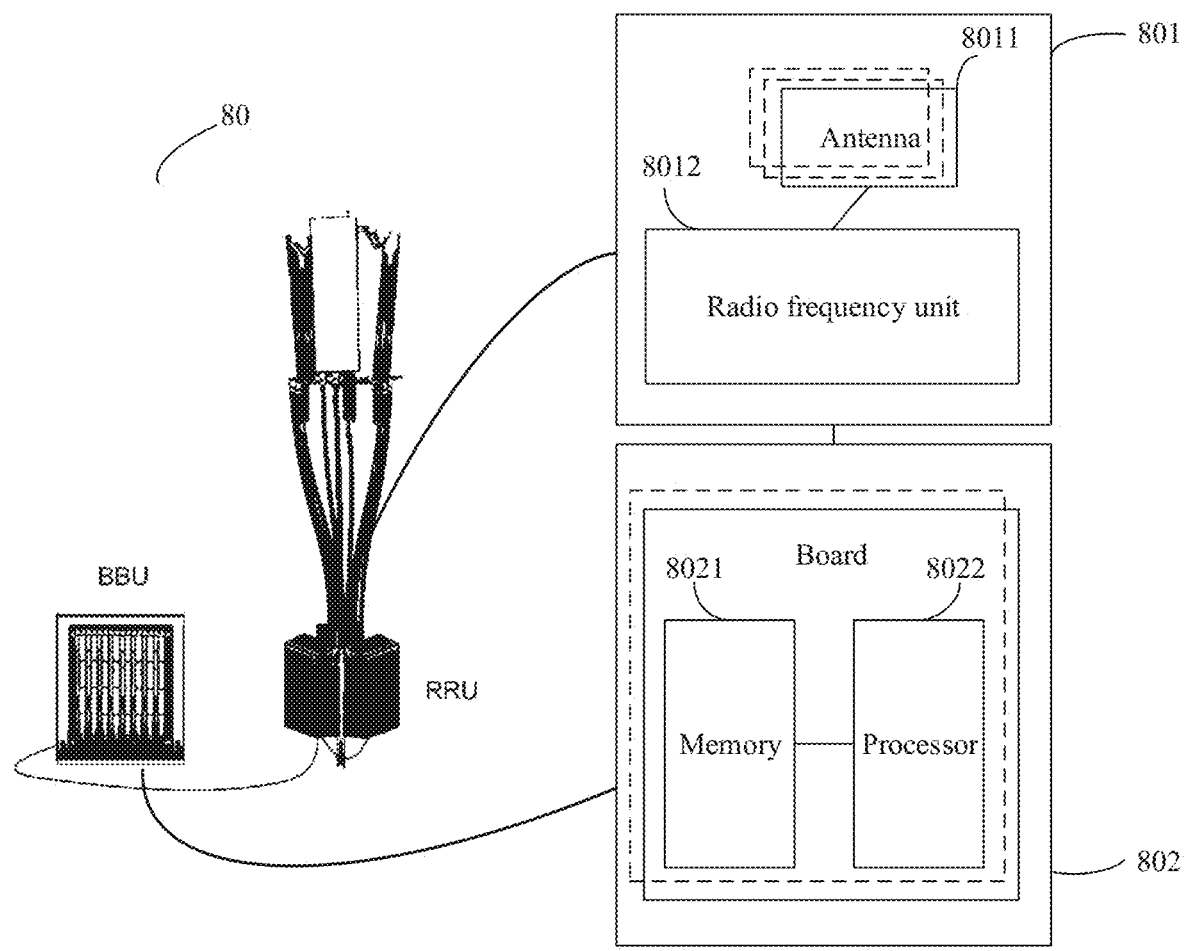
FIG. 8 is a schematic structural diagram of a network device according to an embodiment of this application.

FIG. 8 is a schematic structural diagram of a network device according to an embodiment of this application, for example, may be a schematic structural diagram of a base station. As shown in FIG. 8, the base station may be applied to a system shown in FIG. 1, to perform a function of the network device in the foregoing method embodiments. The base station 80 may include one or more radio frequency units, such as a remote radio unit (RRU) 801 and one or more baseband units (BBU) (which may also be referred to as a digital unit, (DU) 802. The RRU 801 may be referred to as a transceiver unit, a transceiver machine, a transceiver circuit, a transceiver, or the like, and may include at least one antenna 8011 and a radio frequency unit 8012. The RRU 801 is mainly configured to perform receiving and sending of a radio frequency signal and conversion between a radio frequency signal and a baseband signal, for example, send the signaling message in the foregoing embodiment to a terminal device. The BBU 802 is mainly configured to: perform baseband processing, control the base station, and the like. The RRU 801 and the BBU 802 may be physically disposed together, or may be physically separated, for example, in a distributed base station.

The BBU 802 is a control center of the base station, or may be referred to as a processing unit, and is mainly configured to complete baseband processing functions such as channel coding, multiplexing, modulation, and spectrum spreading. For example, the BBU (the processing unit) 802 may be configured to control the base station to perform the operation procedure of the network device in the foregoing method embodiments.

In an example, the BBU 802 may include one or more boards, and a plurality of boards may jointly support a radio access network (such as an LIE network) of a single access standard, or may separately support radio access networks (for example, an LIE network, a 5G network, or another network) of different access standards. The BBU 802 further includes a memory 8021 and a processor 8022. The memory 8021 is configured to store a necessary instruction and necessary data. The processor 8022 is configured to control the base station to perform a necessary action, for example, control the base station to perform the operation procedure of the network device in the foregoing method embodiments. The memory 8021 and the processor 8022 may serve one or more boards. In other words, a memory and a processor may be separately disposed on each board. Alternatively, a plurality of boards may share a same memory and a same processor. In addition, a necessary circuit may be further disposed on each board.

Figure 9:
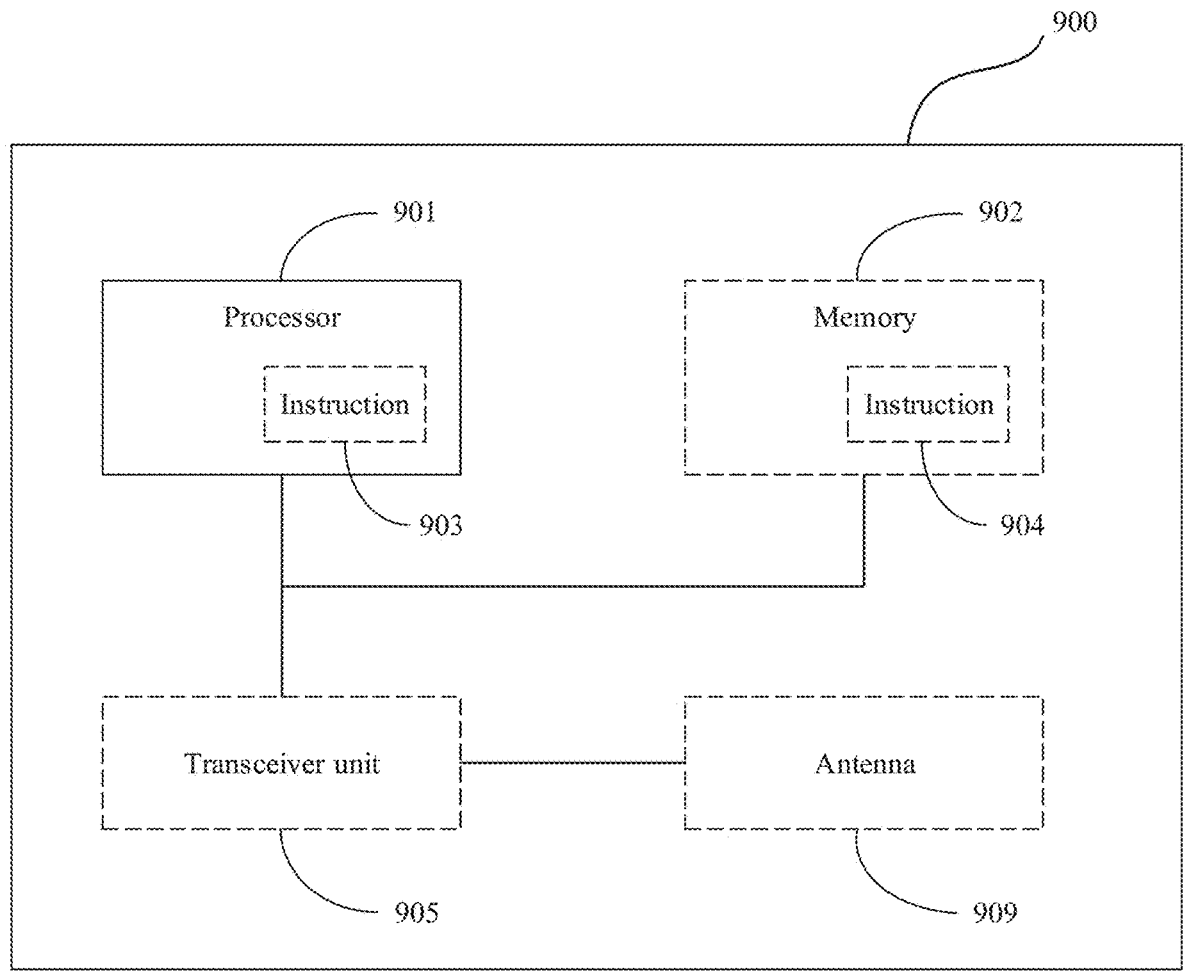
FIG. 9 is a schematic structural diagram of a communications apparatus according to an embodiment of this application.

FIG. 9 is a schematic structural diagram of a communications apparatus 900. The apparatus 900 may be configured to implement the methods described in the foregoing method embodiments. For details, refer to the description in the foregoing method embodiments. The communications apparatus 900 may be a chip, a network device (such as a base station), a terminal device, another network device, or the like.

The communications apparatus 900 includes one or more processors 901. The processor 901 may be a general purpose processor, a dedicated processor, or the like. For example, the processor may be a baseband processor or a central processing unit. The baseband processor may be configured to process a communication protocol and communications data. The central processing unit may be configured to: control the communications apparatus (such as a base station, a terminal, or a chip), execute a software program, and process data of the software program. The communications apparatus may include a transceiver unit that is configured to implement input (receiving) and output (sending) of a signal. For example, the communications apparatus may be a chip, and the transceiver unit may be an input and/or output circuit of the chip, or a communications interface. The chip may be used by a terminal, a base station, or another network device. For another example, the communications apparatus may be a terminal, a base station, or another network device, and the transceiver unit may be a transceiver, a radio frequency chip, or the like.

The communications apparatus 900 includes one or more processors 901, and the one or more processors 901 may implement the method applied to the network device or the terminal device in the embodiments shown in FIG. 2 to FIG. 6.

In a possible design, the communications apparatus 900 includes a means configured to generate downlink control information DCI, and a means configured to send the DCI. Functions of the means configured to generate the DCI and the means configured to send the DCI may be implemented by using the one or more processors. For example, the DCI may be generated by using the one or more processors, and the DCI may be sent by using a transceiver, or an input/output circuit, or an interface of a chip. For indication information, refer to related descriptions in the foregoing method embodiments.

In a possible design, the communications apparatus 900 includes a means configured to generate indication information and QCL information, and a means configured to send the indication information and the QCL information. For the indication information and the QCL information, refer to related descriptions in the foregoing method embodiments. For example, the indication information and the QCL information may be generated by using the one or more processors, and the indication information and the QCL information may be sent by using a transceiver, or an input/output circuit, or an interface of a chip. Refer to the description in the foregoing method embodiments, the indication information and the QCL information may be sent by using the DCI, or the QCL information may be sent by using higher layer signaling such as RRC signaling, and the indication information may be sent by using the DCI.

In a possible design, the communications apparatus 900 includes a means configured to receive downlink control information DCI, and a means configured to determine a DMRS antenna port. For the DCI and how to determine the DMRS antenna port, refer to related descriptions in the foregoing method embodiments. For example, the DCI may be received by using a transceiver, an input/output circuit, or an interface of a chip, and the DMRS antenna port is determined based on the DCI by using the one or more processors, to demodulate a received signal.

In a possible design, the communications apparatus 900 includes a means configured to receive indication information and QCL information, and a means configured to determine a DMRS antenna port. For the indication information and the QCL information, and how to determine the DMRS antenna port based on the indication information and the QCL information, refer to related descriptions in the foregoing method embodiments. For example, the indication information and the QCL information may be received by using a transceiver, an input/output circuit, or an interface of a chip, and the DMRS antenna port is determined based on the indication information and the QCL information by using the one or more processors, to demodulate a received signal.

Optionally, in addition to the methods in the embodiments shown in FIG. 2 to FIG. 6, the processor 901 may further implement another function.

Optionally, in a design, the processor 901 may also include an instruction 903. The instruction may be run on the processor, to enable the communications apparatus 900 to perform the methods described in the foregoing method embodiments.

In another possible design, the communications apparatus 900 may also include a circuit. The circuit may implement the functions in the foregoing method embodiments.

In still another possible design, the communications apparatus 900 may include one or more memories 902 that store an instruction 904. The instruction may be run on the processor, to enable the communications apparatus 900 to perform the methods described in the foregoing embodiments. Optionally, the memory may further store data. Optionally, the processor may also store the instruction and/or the data. For example, the one or more memories 902 may store a correspondence between indication information and combination information described in the foregoing embodiments, or a parameter related to the combination information, or related parameters or tables in the foregoing embodiments. The processor and the memory may be separately disposed, or may be integrated together.

In still another possible design, the communications apparatus 900 may further include a transceiver unit 905 and an antenna 906. The processor 901 may be referred to as a processing unit, and controls the communications apparatus (a terminal or a base station). The transceiver unit 905 may be referred to as a transceiver machine, a transceiver circuit, a transceiver or the like, and is configured to implement sending and receiving functions of the communications apparatus by using the antenna 906.

It should be understood that, the processor in the embodiments of this application may be a central processing unit (CPU). The processor may further be another general purpose processor, a digital signal processor (DSP), an application-specific integrated circuit (ASIC), a field-programmable gate array (FPGA), or another programmable logical device, discrete gate or transistor logical device, discrete hardware component, or the like. The general purpose processor may be a microprocessor, or the processor may be any conventional processor or the like.

It should be further understood that the memory in the embodiments of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of random access memories (RAM) may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM).

All or some of the foregoing embodiments may be implemented by means of software, hardware, firmware, or any combination thereof. When software is used to implement the embodiments, the foregoing embodiments may be implemented completely or partially in a form of a computer program product. The computer program product includes one or more computer instructions or computer programs. When the program instructions or the computer programs are loaded and executed on a computer, the procedure or functions according to the embodiments of this application are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired or wireless (for example, infrared, radio, or microwave) manner. The computer-readable storage medium may be any usable medium accessible by the computer, or a data storage device such as a server or a data center, including one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, wherein the method comprises:
   receiving, by a terminal device, a broadcast message, wherein the broadcast message comprises a first parameter and a second parameter that are for a first cell, wherein the first parameter is used to determine a minimum receive level value required by the first cell when the terminal device supports supplementary uplink (SUL) carrier transmission, and wherein the second parameter is used to determine a minimum receive level value required by the first cell when the terminal device does not support SUL carrier transmission; and
   performing, by the terminal device, cell selection or cell reselection based on the first parameter when the terminal device supports SUL carrier transmission; or
   performing, by the terminal device, cell selection or cell reselection based on the second parameter when the terminal device does not support SUL carrier transmission.

2. The method according to claim 1, wherein the performing, by the terminal device, cell selection or cell reselection based on the first parameter when the terminal device supports SUL carrier transmission comprises:
   determining, based on the first parameter, whether to camp on the first cell, or whether to reselect to the first cell.

3. The method according to claim 1, wherein the performing, by the terminal device, cell selection or cell reselection based on the second parameter when the terminal device does not support SUL carrier transmission comprises:
   determining, based on the second parameter, whether to camp on the first cell, or whether to reselect to the first cell.

4. The method according to claim 2, wherein the determining, based on the first parameter, whether to camp on the first cell, or whether to reselect to the first cell comprises:
   determining, based on Srxlev_1, whether to camp on the first cell, or whether to reselect to the first cell, wherein the $Srxlev\_1 = Q_{rxlevmeas} - (Q_{rxlevmin} - Q_{rxlevminoffset} - \text{Offset\_1}) - \text{Pcompensation}$, wherein the $Q_{rxlevmeas}$ is a received signal strength value measured by the terminal device and the received signal strength value is measured reference signal receiving power (RSRP), wherein the $Q_{rxlevmin}$ is indicated by the first parameter, wherein the $Q_{rxlevminOffset}$ is a parameter that has an offset to $Q_{rxlevmin}$, wherein the Offset_1 is an offset value and the offset value is set by a network device based on a capability of the terminal device or a configuration of the network device, wherein the Pcompensation is a larger value in ($P_{EMAX}$–$P_{UMAX}$) or 0, wherein $P_{EMAX}$ is maximum allowed transmit power, and wherein $P_{UMAX}$ refers to maximum output power.

5. The method according to claim 1, wherein the first cell is a serving cell or a neighboring cell of the terminal device.

6. The method according to claim 1, wherein a value of the first parameter is less than a value of the second parameter.

7. The method according to claim 1, further comprising:
determining, based on the broadcast message by the terminal device, that a frequency band of the first cell comprises an SUL frequency band.

8. A communication method, wherein the method comprises:
sending, by a network device, a broadcast message to a terminal device, wherein the broadcast message comprises a first parameter and a second parameter that are for a first cell, wherein the first parameter is used to determine a minimum receive level value required by the first cell when the terminal device supports supplementary uplink (SUL) carrier transmission, and wherein the second parameter is used to determine a minimum receive level value required by the first cell when the terminal device does not support SUL carrier transmission.

9. The method according to claim 8, wherein the first cell is a serving cell or a neighboring cell of the terminal device.

10. The method according to claim 8, wherein a value of the first parameter is less than a value of the second parameter.

11. A apparatus, comprising:
a memory, configured to store a computer program; and
at least one processor, wherein the computer program stored in the memory, when executed by the at least one processor, enables the apparatus to perform:
receiving a broadcast message, wherein the broadcast message comprises a first parameter and a second parameter that are for a first cell, wherein the first parameter is used to determine a minimum receive level value required by the first cell when the apparatus supports supplementary uplink (SUL) carrier transmission, and wherein the second parameter is used to determine a minimum receive level value required by the first cell when the apparatus does not support SUL carrier transmission; and
performing cell selection or cell reselection based on the first parameter when the apparatus supports SUL carrier transmission; or
performing cell selection or cell reselection based on the second parameter when the apparatus does not support SUL carrier transmission.

12. The apparatus according to claim 11, wherein the performing cell selection or cell reselection based on the first parameter when the apparatus supports SUL carrier transmission comprises:
determining, based on the first parameter, whether to camp on the first cell, or whether to reselect to the first cell.

13. The apparatus according to claim 11, wherein the performing cell selection or cell reselection based on the second parameter when the apparatus does not support SUL carrier transmission comprises:
determining, based on the second parameter, whether to camp on the first cell, or whether to reselect to the first cell.

14. The apparatus according to claim 13, wherein the determining, based on the second parameter, whether to camp on the first cell, or whether to reselect to the first cell comprises:
determining, based on Srxlev, whether to camp on the first cell, or whether to reselect to the first cell, wherein the Srxlev_1=$Q_{rxlevmeas}$–($Q_{rxlevmin}$–$Q_{rxlevminoffset}$–Offset_1)–Pcompensation, wherein the $Q_{rxlevmeas}$ is a received signal strength value measured by the apparatus and the received signal strength value is measured reference signal receiving power (RSRP), wherein the $Q_{rxlevmin}$ is indicated by the second parameter, wherein the $Q_{rxlevminOffset}$ is a parameter that has an offset to $Q_{rxlevmin}$, wherein the Offset_1 is an offset value and the offset value is set by a network device based on a capability of the apparatus or a configuration of the network device, wherein the Pcompensation is a larger value in ($P_{EMAX}$–$P_{UMAX}$) or 0, wherein $P_{EMAX}$ is maximum allowed transmit power, and wherein $P_{UMAX}$ refers to maximum output power.

15. The apparatus according to claim 11, wherein the first cell is a serving cell or a neighboring cell of the apparatus.

16. The apparatus according to claim 11, wherein a value of the first parameter is less than a value of the second parameter.

17. The apparatus according to claim 11, wherein the computer program enables the apparatus to further perform:
determining, based on the broadcast message, that a frequency band of the first cell comprises an SUL frequency band.

18. A apparatus, comprising:
a memory, configured to store a computer program; and
at least one processor, wherein the computer program stored in the memory, when executed by the at least one processor, enables the apparatus to perform:
sending a broadcast message to a terminal device, wherein the broadcast message comprises a first parameter and a second parameter that are for a first cell, wherein the first parameter is used to determine a minimum receive level value required by the first cell when the terminal device supports supplementary uplink (SUL) carrier transmission, and wherein the second parameter is used to determine a minimum receive level value required by the first cell when the terminal device does not support SUL carrier transmission.

19. The apparatus according to claim 18, wherein the first cell is a serving cell or a neighboring cell of the terminal device.

20. The apparatus according to claim 18, wherein a value of the first parameter is less than a value of the second parameter.

* * * * *

UNITED STATES PATENT AND TRADEMARK OFFICE
CERTIFICATE OF CORRECTION

PATENT NO. : 11,317,336 B2  
APPLICATION NO. : 16/875243  
DATED : April 26, 2022  
INVENTOR(S) : Hongping Zhang et al.

Page 1 of 1

It is certified that error appears in the above-identified patent and that said Letters Patent is hereby corrected as shown below:

In the Specification

Column 1/Line 8 (Approx.) - Delete "international" and insert -- International --.

Signed and Sealed this
Fourth Day of October, 2022

Katherine Kelly Vidal
*Director of the United States Patent and Trademark Office*